(12) United States Patent
Miyatake et al.

(10) Patent No.: US 7,023,623 B2
(45) Date of Patent: Apr. 4, 2006

(54) ZOOM LENS AND ELECTRONIC STILL CAMERA USING THE SAME

(75) Inventors: Yoshito Miyatake, Neyagawa (JP); Keiki Yoshitsugu, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/499,790

(22) PCT Filed: Apr. 10, 2003

(86) PCT No.: PCT/JP03/04543

§ 371 (c)(1), (2), (4) Date: Jun. 22, 2004

(87) PCT Pub. No.: WO03/085440

PCT Pub. Date: Oct. 16, 2003

(65) Prior Publication Data

US 2005/0068634 A1    Mar. 31, 2005

(30) Foreign Application Priority Data

Apr. 11, 2002 (JP) ............................. 2002-108705

(51) Int. Cl.
*G02B 15/14* (2006.01)

(52) U.S. Cl. ....................................... 359/676; 359/689

(58) Field of Classification Search ................ 359/676, 359/683, 684, 689
See application file for complete search history.

(56) References Cited

U.S. PATENT DOCUMENTS

| 5,991,091 A | 11/1999 | Hayakawa ................... 359/680 |
| 6,124,984 A | 9/2000 | Shibayama et al. ......... 359/689 |
| 6,545,819 B1 | 4/2003 | Nanba et al. ............... 359/689 |
| 6,611,386 B1 * | 8/2003 | Tanaka ........................ 359/689 |

(Continued)

FOREIGN PATENT DOCUMENTS

EP    1 103 834    5/2001

(Continued)

*Primary Examiner*—Huy Mai
(74) *Attorney, Agent, or Firm*—Hamre, Schumann, Mueller & Larson, P.C.

(57) ABSTRACT

It is an object to provide a zoom lens made of three groups having a zoom ratio of ×2.5 to ×3.2 if the object distance is ∞, an field angle at the wide-angle end of 60° to 70°, high resolution, and a short optical total length when not in use. The zoom lens is made of a first lens group (G1) with a negative power, a second lens group (G2) with a positive power, and a third lens group (G3) with a positive power, arranged in that order from an object side to an image plane (S) side. The first lens group (G1) is made of a first lens (L1) that is a negative meniscus lens whose surface with strong curvature is facing the image plane (S) side and a second lens (L2) that is a positive meniscus lens whose surface with strong curvature is facing the object side, arranged in that order from the object side. The second lens group (G2) is made of a third lens (L3) that is a positive lens whose convex surface is facing the object side, a fourth lens (L4) that is a positive lens, a fifth lens (L5) that is a negative lens, and a sixth lens (L6) that is a plano-convex lens whose convex surface is facing the image plane (S) side, arranged in that order from the object side. The third lens group (G3) is made of a single seventh lens (L7) that is a positive lens.

32 Claims, 18 Drawing Sheets

U.S. PATENT DOCUMENTS 6,646,815 B1 * 11/2003 Nobe .......................... 359/689
6,671,103 B1 * 12/2003 Itoh ........................... 359/689
2002/0149857 A1 10/2002 Nobe .......................... 359/676

FOREIGN PATENT DOCUMENTS

| JP | 11-52245 | 2/1999 |
| JP | 11-194274 | 7/1999 |
| JP | 2000-298235 | 10/2000 |
| JP | 2001-296475 | 10/2001 |
| JP | 2001-296476 | 10/2001 |
| JP | 2002-323654 | 11/2002 |
| JP | 2002-372667 | 12/2002 |

* cited by examiner

.750 FA

ON AXIS

-.750 FA

.750 FA

ON AXIS

-.750 FA

ZOOM LENS AND ELECTRONIC STILL CAMERA USING THE SAME

TECHNICAL FIELD

The present invention relates to zoom lenses and electronic still cameras using the same. More specifically, it relates to zoom lenses with high picture quality used in electronic still cameras and to electronic still cameras using these zoom lenses.

BACKGROUND ART

As personal computers have become more developed and widespread, electronic still cameras quickly have gained popularity as image input devices. The total pixel number of the solid-state imaging elements used in electronic still cameras has exceeded 1 million pixels, and recently electronic still cameras provided with solid-state imaging elements having a total pixel number greater than 3 million pixels also have appeared on the market. Video cameras that are capable of capturing high-quality still images in addition to moving pictures also have appeared on the market.

The optical system of electronic still cameras is provided with a taking lens, an optical low-pass filter, and a solid-state imaging element arranged in that order from the object side to the image plane side. The taking lens forms on the imaging surface of the solid-state imaging element an actual image that corresponds to an object. The solid-state imaging element carries out spatial sampling depending on the pixel structure, and outputs an image signal of the image formed on the imaging surface. The solid-state imaging element is thin, lightweight, and compact, and therefore the electronic still camera can be made compact.

Solid-state imaging elements perform spatial sampling depending on the pixel structure, however, an optical low-pass filter is typically disposed between a zoom lens, which serves as the taking lens, and the solid-state imaging element to remove the aliasing distortion that occurs at this time, removing high-frequency components from the image formed by the zoom lens. Typically, optical low-pass filters are made of a quartz plate. Here, the characteristic that is exploited is that when natural light is incident on the quartz plate, the natural light is split into an ordinary ray and an extraordinary ray due to the birefringence of the quartz, and these are emitted parallel to one another.

With solid-state imaging elements, when the pixel number is increased but the picture plane size is kept the same, the pixel pitch becomes small, lowering the aperture ratio and the photosensitivity. Accordingly, by providing a miniature positive lens at each pixel of the solid-state imaging element, the effective aperture ratio is increased, preventing a drop in the photosensitivity. In this case, to allow most of the light emitted from the miniature positive lenses to arrive at corresponding pixels, it is necessary to configure the zoom lens so that the principle rays that are incident on the pixels are substantially parallel to the optical axis. That is, there must be good telecentricity.

Although electronic still cameras come in many forms, one example is a compact type electronic still camera provided with a zoom lens having a ×2 to ×3 zoom ratio. One demand on compact type electronic still cameras is that they be easy to carry, and it is necessary that the optical total length at least when not in use (the distance from the apex of the lens surface most on the object side of the overall lens system to the imaging surface of the solid-state imaging element) is short.

A zoom lens that is conceivably suited to meet these demands is a two-group zoom lens constituted by a first lens group having a negative power and a second lens group having a positive power arranged in that order from the object side to the image plane side, which performs zooming by changing the spacing between these two lens groups. However, a characteristic of such zoom lenses composed of two lens groups is that they are suited for wide angles, and thus have the problem of a small zoom ratio of about ×2. Also, to perform focus adjustment, it is necessary to move at least one of the two lens groups, but since both lens groups are large and heavy, there is also the problem that two-group zoom lenses as described above are not suited for autofocus. Accordingly, to solve these problems, many proposals have been made for zoom lenses constituted by three lens groups, in which a third lens group having a positive power is disposed on the image plane side of a zoom lens having two lens groups.

For example, JP H11-194274A discloses a zoom lens constituted by three lens groups, these being a first lens group, arranged in that order from the object side in a negative, positive power arrangement, a second lens group constituted by four lenses, and a third lens group constituted by a single lens. Also, JP 2001-296475A discloses a zoom lens constituted by three lens groups, these being a first lens group, arranged in that order from the object side in a negative, positive power arrangement or in a negative, negative, positive power arrangement, a second lens group constituted by four lenses, and a third lens group constituted by a single lens or a single cemented lens.

These zoom lenses constituted by three lens groups are made of a first lens group having a negative power, a second lens group having a positive power, and a third lens group having a positive power, arranged in that order from the object side to the image plane side. When zooming from the wide-angle end to the tele end, the air space between the first lens group and the second lens group is monotonically decreased and the air space between the second lens group and the third lens group is monotonically increased and the third lens group is moved. Moving the third lens group in the direction of the optical axis carries out focus adjustment. The third lens group improves the telecentricity. Here, the third lens group is made of a single lens or a single cemented lens with a small outer diameter and can be driven at high speeds using a low-power compact motor, and thus it is suited as a lens group for focus adjustment in autofocus, in which high-speed movement is required. The movement of the first lens group and the second lens group is carried out using cylindrical cams. Consequently, a collapsing configuration in which all three lens groups are drawn toward the solid-state imaging element using cylindrical cams when the zoom lens is not in use can be adopted. Also, if such a zoom lens is used in an electronic still camera, then the electronic still camera can be made thin in the depth direction when not in use.

Among video cameras, those provided with a camera shake-correction function for correcting vibration of the captured image when the user's camera shakes have been released on the market. Many methods have been proposed for camera shake correction, and methods for parallel displacing some of the lens groups of the zoom lens in the direction perpendicular to the optical axis are gradually being adopted (for example, JP 2000-298235A).

JP H11-52245A discloses a zoom lens made of a first lens group having a negative power, a second lens group having a positive power, a third lens group having a positive power, and a fourth lens group having a positive power or a negative power, arranged in that order from the object side to the image plane side, wherein correction of camera shake is carried out by parallel displacement of the third lens group in the direction perpendicular to the optical axis. This publication also discloses that decentering curvature of field and decentering coma when the third lens group is parallel displaced for correction of camera shake can be favorably corrected.

With compact type electronic still cameras, from the standpoint of ease of carrying, it is preferable that they are thin in the depth direction when not in use. It is also preferable that the captured images are made high resolution.

To make an electronic still camera thin in the depth direction when not in use, it is possible to reduce the picture plane size of the solid-state imaging element and to shorten the optical total length of the zoom lens when not in use. Also, to shorten the optical total length when the zoom lens is not in use, the zoom lens can be given a collapsing configuration and the overall length of each of the lens groups can be shortened so as to shorten the distance between the lens groups when collapsed.

To make the images captured by an electronic still camera high resolution, it is necessary to increase the pixel number of the solid-state imaging element and make its zoom lens high resolution.

However, reducing the picture plane size of the solid-state imaging element and increasing the pixel number significantly reduces the pixel pitch, and thus it is necessary to be careful that the image-forming properties of the zoom lens are deteriorated due to the effects of diffraction. To reduce the effect of diffraction, the F-number of the zoom lens can be made small.

Also, taking into account the fact that the peripheral portion of the captured image may be cut away, it is preferable that the entire picture resolution of the captured image is more uniform. Solid-state imaging elements have good resolution uniformity, but the resolution of the zoom lens generally tends to be high at the center of the image plane and low at the peripheral portions of the image plane.

Also, in the zoom lens discussed in JP H11-194274A, the distortion is small but both the curvature of field in the sagittal direction and the curvature of field in the meridional direction are large. Thus, the zoom lens described in this publication has the problem that the image-forming properties at the peripheral portions of the image plane are not good. Also, the zoom lenses disclosed in JP 2001-296475A and JP H2001-296476A have the problem that it is difficult to achieve good resolution at the peripheral portions of the image plane due to sagittal flare that occurs at the peripheral portions of the image plane.

Zoom lenses for electronic still cameras have the problem that, compared to zoom lens used in 35 mm film cameras, the production tolerance of the lens elements and the assembly tolerance of the zoom lens unit are very severe. This is due to the fact that the diagonal length of the effective picture area of a solid-state imaging element is significantly smaller than the 43.3 mm diagonal length of the effective picture area (36 mm horizontal×24 mm vertical) of the 35 mm film camera. Also, to achieve a collapsed configuration, a moving lens barrel that moves during zooming and a stationary lens barrel that supports the moving lens barrel are required, but when the optical total length when in use is much longer than the optical total length when collapsed, the stationary lens barrel cannot stably support the moving lens barrel, and thus a portion of the lens groups becomes decentered, leading to the problem of a deteriorated ability to form the captured image. For that reason, the design performance of the zoom lens is good, but since the production tolerance and the assembly tolerance of the lens elements and the lens barrel components are extremely severe, there is the problem that it is difficult to achieve image-forming property that is near the design performance through mass production.

The zoom lens disclosed in JP H11-52245A has a function for correcting camera shake, but it has the problem that the overall length of the second lens group is long due to the incorporation of a long air distance or a thick lens, and thus even if a collapsed configuration is adopted, the optical total length when collapsed is not particularly short. Also, the zoom lens discussed in this publication is made of ten or eleven lenses, and due to the large number of lenses, there is also the problem of increased costs.

DISCLOSURE OF INVENTION

The present invention was arrived at in order to solve the foregoing problems of the conventional art, and it is an object thereof to provide zoom lenses having a zoom ratio of ×2.5 to ×3.2 when the object distance is ∞, a field angle at the wide-angle end of 60° to 70°, a high resolution, a short optical total length when not in use, and a low sensitivity to decentration, and also to provide zoom lenses with a camera shake correction function. It is another object of the present invention to provide electronic still cameras that are thin in the depth direction when not in use, and moreover, electronic still cameras provided with a camera shake correction function, by employing these zoom lenses.

To achieve the foregoing objects, a first configuration of a zoom lens according to the present invention is provided with a first lens group with a negative power, a second lens group with a positive power to whose object side an aperture stop has been fixed, and a third lens group with a positive power, arranged in that order from an object side to an image plane side, wherein the first lens group includes a first lens that is a negative meniscus lens whose surface with strong curvature is facing the image plane side, and a second lens that is a positive lens whose surface with strong curvature is facing the object side, arranged in that order from the object side, the second lens group includes a third lens that is a positive lens whose surface with strong curvature is facing the object side, a fourth lens that is a positive lens, a fifth lens that is a negative lens, and a sixth lens that is a positive lens, arranged in that order from the object side, the third lens group includes a seventh lens that is a positive lens, the image plane side surface of the first lens and the object side surface of the third lens are aspherical surfaces whose local radius of curvature is monotonically increased as distance from the center increases, one of the surfaces of the seventh lens is an aspherical surface, when zooming from a wide-angle end to a tele end when an object distance is ∞, the first lens group retreats to the image plane side and then moves toward the object side and the second lens group moves monotonically toward the object side, and when $L_W$ is a length from an apex of the object side surface of the first lens to the image plane at the wide-angle end, $L_T$ is a length from the apex of the object side surface of the first lens to the image plane at the tele end, $f_W$ is a combined focal length of the entire lens system at the wide-angle end at an object distance of ∞, $f_{G2}$ is a combined focal length of the second lens group, $f_{G3}$ is a combined focal length of the third lens group, $f_i$ is a focal length of the i-th (i is a natural number) lens, $n_i$ is a refractive index of the i-th lens, and $v_i$ is the Abbe number of the i-th lens, then conditional expressions $$|L_W - L_T|/L_W < 0.1 \tag{1}$$

$$1.9 < f_{G2}/f_W < 2.4 \tag{2}$$

$$3.2 < f_{G3}/f_W < 4.0 \tag{3}$$

$$0.6 < f_3/f_{G2} < 1.1 \tag{4}$$

$$1.5 < f_6/f_{G2} < 1.8 \tag{5}$$

$$n_3 > 1.75 \tag{6}$$

$$v_3 > 35 \tag{7}$$

$$n_4 > 1.6 \tag{8}$$

$$v_4 > 45 \tag{9}$$

$$n_6 > 1.7 \tag{10}$$

$$35 < v_6 < 50 \tag{11}$$

are satisfied, a zoom ratio is ×2.5 to ×3.2 if the object distance is ∞, and a field angle at the wide-angle end is 60° to 70°.

Also, in the first configuration of the zoom lens according to the present invention, it is preferable that when $r_{3F}$ is a paraxial radius of curvature of the object side surface of the third lens, $\kappa_{3F}$ is a conic constant of the object side surface of the third lens, and $D_{3F}$ is a fourth-order aspheric coefficient of the object side surface of the third lens, then conditional expression $$-0.8 < \kappa_{3F} + 8 D_{3F} r_{3F}^3 < -0.5 \tag{12}$$

is satisfied.

In the first configuration of the zoom lens according to the present invention, it is also preferable that when zooming from the wide-angle end to the tele end when the object distance is ∞, the third lens group retreats to the image plane side and then moves toward the object side.

In the first configuration of the zoom lens according to the present invention, it is also preferable that the fourth lens and the fifth lens are cemented.

In the first configuration of the zoom lens according to the present invention, it is also preferable that the fifth lens and the sixth lens are in contact outside their effective diameters.

In the first configuration of the zoom lens according to the present invention, it is also preferable that the image plane side surface of the third lens is a flat surface or a concave surface.

A second configuration of a zoom lens according to the present invention is provided with a first lens group with a negative power, a second lens group with a positive power to whose object side an aperture stop has been fixed, and a third lens group with a positive power, arranged in that order from an object side to an image plane side, wherein the first lens group includes a first lens that is a negative meniscus lens whose surface with strong curvature is facing the image plane side, and a second lens that is a positive lens whose surface with strong curvature is facing the object side, arranged in that order from the object side, the second lens group includes a third lens that is a positive lens whose surface with strong curvature is facing the object side, a fourth lens that is a positive lens, a fifth lens that is a negative lens, and a sixth lens that is a positive lens, arranged in that order from the object side, the third lens group includes a seventh lens that is a positive lens, the image plane side surface of the first lens and the object side surface of the third lens are aspherical surfaces whose local radius of curvature is monotonically increased as distance from the center increases, one of the surfaces of the seventh lens is an aspherical surface, when zooming from a wide-angle end to a tele end when an object distance is ∞, the first lens group retreats to the image plane side and then moves toward the object side and the second lens group moves monotonically toward the object side, and when $L_W$ is a length from an apex of the object side surface of the first lens to the image plane at the wide-angle end, $L_T$ is a length from the apex of the object side surface of the first lens to the image plane at the tele end, $f_W$ is a combined focal length of the entire lens system at the wide-angle end at an object distance of ∞, $f_{G2}$ is a combined focal length of the second lens group, $f_{G3}$ is a combined focal length of the third lens group, $f_i$ is a focal length of the i-th (i is a natural number) lens, $n_i$ is a refractive index of the i-th lens, and $v_i$ is the Abbe number of the i-th lens, then the conditional expressions $$|L_W - L_T|/L_W < 0.1 \tag{1}$$

$$1.9 < f_{G2}/f_W < 2.4 \tag{2}$$

$$3.2 < f_{G3}/f_W < 4.0 \tag{3}$$

$$0.6 < f_3/f_{G2} < 1.1 \tag{4}$$

$$1.5 < f_6/f_{G2} < 1.8 \tag{5}$$

$$n_3 > 1.75 \tag{6}$$

$$v_3 > 35 \tag{7}$$

$$n_4 > 1.6 \tag{8}$$

$$v_4 > 45 \tag{9}$$

$$n_6 > 1.7 \tag{10}$$

$$35 < v_6 < 50 \tag{11}$$

are satisfied, a zoom ratio is ×2.5 to ×3.2 if the object distance is ∞, and a field angle at the wide-angle end is 60° to 70°.

Also, in the second configuration of the zoom lens according to the present invention, it is preferable that when $r_{3F}$ is a paraxial radius of curvature of the object side surface of the third lens, $\kappa_{3F}$ is a conic constant of the object side surface of the third lens, and $D_{3F}$ is a fourth-order aspheric coefficient of the object side surface of the third lens, then the conditional expression $$-0.8 < \kappa_{3F} + 8 D_{3F} r_{3F}^3 < -0.5 \tag{12}$$

is satisfied.

In the second configuration of the zoom lens according to the present invention, it is also preferable that when zooming from the wide-angle end to the tele end when the object distance is ∞, the third lens group retreats to the image plane side and then moves toward the object side.

In the second configuration of the zoom lens according to the present invention, it is also preferable that the fourth lens and the fifth lens are cemented.

In the second configuration of the zoom lens according to the present invention, it is also preferable that the fifth lens and the sixth lens are in contact outside their effective diameters.

In the second configuration of the zoom lens according to the present invention, it is also preferable that the image plane side surface of the third lens is a flat surface or a concave surface.

In the second configuration of the zoom lens according to the present invention, it is also preferable that when $r_{1F}$ is the radius of curvature of the object side surface of the first lens and $r_{2R}$ is the radius of curvature of the image plane side surface of the second lens, then the conditional expressions $$9 < r_{1F}/f_W < 13 \quad (13)$$

$$3.8 < r_{2R}/f_W < 4.7 \quad (14)$$

are satisfied.

A third configuration of a zoom lens according to the present invention is provided with a first lens group with a negative power, an aperture stop, a second lens group with a positive power, and a third lens group with a positive power, arranged in that order from an object side to an image plane side, wherein the first lens group includes a first lens that is a negative lens whose surface with strong curvature is facing the image plane side, and a second lens that is a positive lens whose surface with strong curvature is facing the object side, arranged in that order from the object side, the second lens group includes a third lens that is a positive lens whose surface with strong curvature is facing the object side, a fourth lens that is a positive lens, a fifth lens that is a negative lens, and a sixth lens that is a positive lens, arranged in that order from the object side, and also can be parallel displaced in a direction perpendicular to an optical axis, the third lens group includes a seventh lens that is a positive lens, when zooming from a wide-angle end to a tele end when an object distance is ∞, the first lens group retreats to the image plane side and then moves toward the object side and the second lens group moves monotonically toward the object side, and when $f_W$ is a combined focal length of the entire lens system at the wide-angle end at an object distance of ∞, $f_{G2}$ is a combined focal length of the second lens group, and $m_{G2T}$ and $m_{G3T}$ are magnifications of the second lens group and the third lens group, respectively, at the tele end at an object distance of ∞, then the conditional expressions $$1.9 < f_{G2}/f_W < 2.4 \quad (2)$$

$$1.7 < (1-m_{G2T})m_{G3T} < 2.1 \quad (15)$$

are satisfied, a zoom ratio is ×2.5 to ×3.2 if the object distance is ∞, and a field angle at the wide-angle end is 60° to 70°.

In the third configuration of the zoom lens according to the present invention, it is preferable that focus adjustment is carried out by moving the third lens group in the direction of the optical axis.

In the third configuration of the zoom lens according to the present invention, it is also preferable that when $L_W$ is a length from an apex of the object side surface of the first lens to the image plane at the wide-angle end, $L_T$ is a length from the apex of the object side surface of the first lens to the image plane at the tele end, then the conditional expression $$|L_W - L_T|/L_W < 0.1 \quad (1)$$

is satisfied.

In the third configuration of the zoom lens according to the present invention, it is also preferable that when $f_{G3}$ is a combined focal length of the third lens group, then the conditional expression $$3.2 < f_{G3}/f_W < 4.0 \quad (3)$$

is satisfied.

In the third configuration of the zoom lens according to the present invention, it is also preferable that when $f_3$ is a focal length of the third lens and $f_6$ is a focal length of the sixth lens, then the conditional expressions $$0.6 < f_3/f_{G2} < 1.1 \quad (4)$$

$$1.5 < f_6/f_{G2} < 1.8 \quad (5)$$

are satisfied.

In the third configuration of the zoom lens according to the present invention, it is also preferable that when $n_i$ is a refractive index of the i-th lens (i is a natural number) and $v_i$ is the Abbe number of the i-th lens, then the conditional expressions $$n_3 > 1.75 \quad (6)$$

$$v_3 > 35 \quad (7)$$

$$n_4 > 1.7 \quad (8')$$

$$v_4 > 45 \quad (9)$$

$$n_6 > 1.7 \quad (10)$$

$$35 < v_6 < 50 \quad (11)$$

are satisfied.

In the third configuration of the zoom lens according to the present invention, it is also preferable that the image plane side surface of the first lens is an aspherical surface whose local radius of curvature is monotonically increased as distance from the center increases, and that at least one of the surfaces of the seventh lens is an aspherical surface.

In the third configuration of the zoom lens according to the present invention, it is also preferable that the object side surface of the third lens is an aspherical surface whose local radius of curvature is monotonically increased as distance from the center increases.

In the third configuration of the zoom lens according to the present invention, it is also preferable that the object side surface of the third lens is an aspherical surface, and that when $r_{3F}$ is a paraxial radius of curvature of the aspherical surface, $\kappa_{3F}$ is a conic constant of the aspherical surface, and $D_{3F}$ is a fourth-order aspheric coefficient of the aspherical surface, then the conditional expression $$-0.8 < \kappa_{3F} + 8 D_{3F} r_{3F}^3 < -0.5. \quad (12)$$

is satisfied.

In the third configuration of the zoom lens according to the present invention, it is also preferable that the fourth lens and the fifth lens are cemented.

In the third configuration of the zoom lens according to the present invention, it is also preferable that the fifth lens and the sixth lens are in contact outside their effective diameters.

In the third configuration of the zoom lens according to the present invention, it is also preferable that the image plane side surface of the third lens is a flat surface or a concave surface.

In the third configuration of the zoom lens according to the present invention, it is also preferable that when $r_{1F}$ is the radius of curvature of the object side surface of the first lens and $r_{2R}$ is the radius of curvature of the image plane side surface of the second lens, then the conditional expressions $$9 < r_{1F}/f_W < 13 \tag{13}$$

$$3.8 < r_{2R}/f_W < 4.7 \tag{14}$$

are satisfied.

It should be noted that in the present invention, there is only one lens in which a thin resin layer provided on the surface of a glass lens and the surface of that resin layer is an aspherical surface.

A first configuration of an electronic still camera according to the present invention is provided with a zoom lens and a solid-state imaging element, and the first configuration of the zoom lens according to the present invention is used as its zoom lens.

A second configuration of an electronic still camera according to the present invention is provided with a zoom lens and a solid-state imaging element, and the second configuration of the zoom lens according to the present invention is used as its zoom lens.

In the second configuration of the electronic still camera according to the present invention, it is preferable that tilt of the solid-state imaging element can be adjusted.

A third configuration of an electronic still camera according to the present invention is provided with a zoom lens and a solid-state imaging element, and the third configuration of the zoom lens according to the present invention is used as its zoom lens.

The third configuration of the electronic still camera according to the present invention preferably further includes an electronic zoom means that uses a signal processing circuit to magnify, up to full image plane, an image formed in a center portion of the solid-state imaging element.

In the third configuration of the electronic still camera according to the present invention, it is preferable that tilt of the solid-state imaging element can be adjusted.

BEST MODE FOR CARRYING OUT THE INVENTION

Hereinafter, the present invention is described in further detail using embodiments.

FIRST EMBODIMENT

Figure 1:
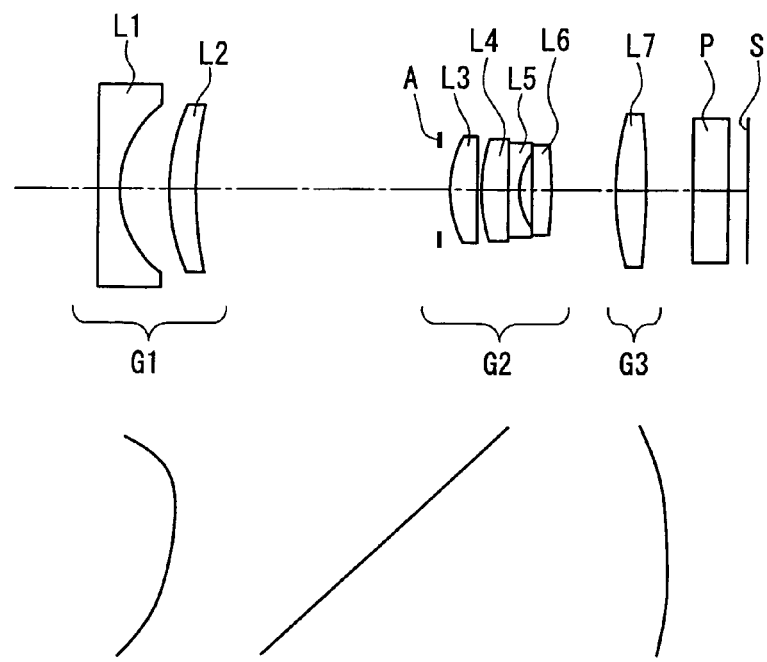
FIG. 1 is a layout drawing showing the configuration of a zoom lens according to a first embodiment of the present invention.

FIG. 1 is a layout drawing showing the configuration of a zoom lens according to a first embodiment of the present invention. This zoom lens is configured so that the resolution is high and the optical total length when collapsed is short.

As shown in FIG. 1, the zoom lens of this embodiment is made of a first lens group G1 having a negative power, a second lens group G2 having a positive power, and a third lens group G3 having a positive power, arranged in that order from the object side (left side in FIG. 1) to the image plane S side (right side in FIG. 1), and includes seven lenses. An aperture stop A is fixed on the object side of the second lens group G2, and moves in the direction of the optical axis together with the second lens group G2. Here, when zooming from the wide-angle end to the tele end at an object distance of ∞, the first lens group G1 retreats to the image plane S side and then moves toward the object side, the second lens group G2 moves monotonically toward the object side, and the third lens group G3 retreats to the image plane S side and then moves toward the object side. Moving the third lens group G3 in the direction of the optical axis carries out focus adjustment.

The first lens group G1 is made of a first lens L1 that is a negative meniscus lens whose surface with strong curvature is facing the image plane S side, and a second lens L2 that is a positive meniscus lens (positive lens) whose surface with strong curvature is facing the object side, arranged in that order from the object side.

The second lens group G2 is made of a third lens L3 that is a positive lens whose convex surface (surface with strong curvature) is facing the object side, a fourth lens L4 that is a positive lens, a fifth lens L5 that is a negative lens, and a sixth lens L6 that is a plano-convex lens (positive lens) whose convex surface is facing the image plane S side, arranged in that order from the object side.

The third lens group G3 is made of a seventh lens L7 that is one positive lens.

The fourth lens L4 and the fifth lens L5 are cemented, and the fifth lens L5 and the sixth lens L6 are in contact with one another outside their effective diameters. The surface on the image plane S side of the first lens L1 and the surface on the object side of the third lens L3 are both aspherical surfaces whose local radius of curvature monotonically increases as distance from the center increases, and the surface on the image plane S side of the seventh lens L7 is an aspherical surface.

The local radius of curvature p at the height h of the aspherical surface from the optical axis is found as shown in Expression 1 below.

$$\rho = \frac{\left(1+\left(\frac{dz}{dh}\right)^2\right)^{3/2}}{\frac{d^2z}{dh^2}} \quad \text{Expression 1}$$

In Expression 1 above, z denotes the sag amount at a height h on the aspherical surface from the optical axis.

On the image plane S side of the zoom lens, an infrared cut filter, an optical low-pass filter constituted by three quartz plates, and a solid-state imaging element are arranged in that order from the object side, and a cover glass for protection is attached to the solid-state imaging element. In FIG. 1, the infrared cut filter, the optical low-pass filter, and the cover glass are expressed as one equivalent parallel plate element P. The image of the object captured by the zoom lens is formed on the imaging surface (image plane S) of the solid-state imaging element.

Giving the zoom lens shown in FIG. 1 a collapsing structure in which the first lens group G1, the second lens group G2, and the third lens group G3 are drawn toward the solid-state imaging element side when not in use allows the optical total length when collapsed to be shortened. A collapsing structure can be achieved by extending the cam grooves of the cylindrical cams for moving the first lens group G1 and the second lens group G2 in the direction of the optical axis.

The basic principle behind the basic configuration of the zoom lens of the present invention is described below.

The zoom lens of the present invention is a zoom lens constituted by three lens groups in which a lens group with a positive power is added to the image plane side of a zoom lens constituted by two lens groups with a negative, positive power arrangement in that order from the object side that serves as a base.

The zooming of this zoom lens is carried out by changing the air space between the first lens group G1 and the second lens group G2 and also moving the third lens group G3 in the direction of the optical axis. Also, moving the third lens group G3 in the direction of the optical axis carries out focus adjustment. The third lens group G3 is the lightest of the three lens groups, and thus it is suited as the lens group for focus adjustment of autofocus, for which a high movement speed is desirable. Also, since the third lens group G3 also acts to improve the telecentricity, it is favorable to use a solid-state imaging element in which miniature positive lenses are provided for each pixel.

To shorten the optical total length of a zoom lens constituted by three lens groups when not in use, the overall length of the three lens groups can be reduced. Thus, as will be discussed later, the three lens groups are each made of a reduced number of lenses and the overall length of each lens group is made as short as possible.

In compact type electronic still cameras, it is desirable that the optical total length when not in use is shortened and that the outer diameter of the lens barrel of the zoom lens is reduced. Since the upper limit of the rotational angle of the cylindrical cams is for example 120° or less, the slant angle of the cam grooves increases when the diameter of the cylindrical cams is reduced, making it difficult to smoothly move the first lens group G1 and the second lens group G2. Also, since the lens barrel is made of one stationary lens barrel and one or more moving lens barrels, to shorten the optical total length when collapsed it is necessary to shorten the stationary lens barrel and the moving lens barrel(s). However, if the ratio of the maximum value of the optical total length when in use to the maximum value of the optical total length when collapsed is large, then the first lens group G1 and the second lens group G2 easily become decentered, deteriorating the image-forming properties of the lens system as a whole. To solve these problems, the maximum value of the optical total length when in use can be made small.

Accordingly, the zoom lens of this embodiment is configured such that the difference between the optical total length at the wide-angle end and the optical total length at the tele end is reduced to make the maximum value of the optical total length when in use small. Also, the zoom lens of this embodiment has been configured in such a way that the combined focal length of the second lens group G2 and the combined focal length of the third lens group G3 are set appropriately and the focal length of the third lens L3 and the focal length of the sixth lens L6 are set appropriately to achieve good image-forming properties and a short optical total length when in use. Moreover, the zoom lens of this embodiment is configured in such a manner that when zooming from the wide-angle end to the tele end with an object distance of $\infty$, the third lens group G3 retreats to the image plane S side and then moves toward the object side, reducing the maximum value of the optical total length when in use.

The optical total length when in use of a zoom lens constituted by two lens groups of negative and positive power arranged in that order from the object side is longest at the wide-angle end and the tele end and shortest at zoom positions therebetween. Also, when a third lens group that has a positive power is arranged in a fixed location on the image plane side of the zoom lens constituted by two lens groups, the optical total length when in use is still longest at the wide-angle end and the tele end and shortest at zoom positions therebetween. From this it can be understood that when the third lens group G3 is separated from the image plane S the optical total length becomes shorter at the wide-angle end and the tele end. To increase this effect, the magnification of the third lens group G3 can be increased, and to do that the combined focal length of the third lens group G3 can be shortened and the third lens group G3 be separated from the image plane S. Since it is not necessary to forcibly shorten the optical total length between the wide-angle end and the tele end, the third lens group G3 can be brought closer to the image plane S in order to reduce the spherical aberration that is generated at the third lens group G3. Taking the above matters into consideration, the zoom lens of this embodiment is configured such that the third lens group G3 retreats to the image plane S side and then moves toward the object side when zooming from the wide-angle end to the tele end at an object distance of $\infty$.

In the zoom lens of this embodiment, the following measures have been taken into order to shorten the total length of each lens group.

In order to shorten its overall length, the first lens group G1 has been made of two lenses, a negative lens and a positive lens, arranged in that order from the object side. The first lens L1 is a negative lens (negative meniscus lens) that generates negative distortion, and the positive second lens L2 generates positive distortion in order to reduce the negative distortion at the wide-angle end of the overall lens system. Also, to further reduce this distortion, the image plane S side surface of the first lens L1 is an aspherical surface whose local radius of curvature increases monotonically as distance from the center increases.

The second lens group G2 is made of four lenses, which are a positive lens, a positive lens, a negative lens, and a positive lens, arranged in that order from the object side. Also, here, the positive lens with the strong positive power is arranged furthest on the object side and the positive lens with the weak positive power is arranged furthest on the image plane S side, so that the principal point of the object side of the second lens group G2 is deviated toward the object side. Thus, at the tele end where the first lens group G1 and the second lens group G2 are nearest one another, the distance from the principal point on the image plane S side of the first lens group G1 to the principal point on the object side of the second lens group G2 can be shortened, allowing the combined focal length of the second lens group G2 to be shortened, and thus the optical total length during use is shortened. Also, with the configuration of the zoom lens of this embodiment, the fourth lens L4 and the fifth lens L5 are cemented and the fifth lens L5 and the sixth lens L6 are in contact with one another outside their effective diameters, thereby shortening the overall length of the second lens group G2.

In the zoom lens of this embodiment, the aperture stop A is disposed near the object side of the third lens L3, and thus the incidence height of axial light is largest at the third lens L3, and if both surfaces of the third lens L3 are spherical, then a negative spherical aberration occurs at the third lens L3. Accordingly, by making the object side surface of the third lens L3 an aspherical surface in which the local radius of curvature increases monotonically with increased distance from the center, a reduction in the spherical aberration that occurs at the third lens group G3 is achieved.

The third lens group G3 is constituted by a seventh lens L7 that is one positive lens and thus it has a short overall length. The image plane S side surface of the seventh lens L7 is an aspherical surface, which generates positive distortion, reducing the absolute value of the negative distortion at the wide-angle end.

Focus adjustment is carried out by fixing the first lens group G1 and the second lens group G2 and moving only the third lens group G3 in the direction of the optical axis. Here, the third lens group G3 moves toward the object side as the object distance shortens. The third lens group G3 is made of one lens, and the moving portion, which includes other mechanical components that move, is lightweight, so that the third lens group G3 can be moved at high speeds using a low-power compact motor, and thus autofocus adjustment can be carried out quickly. It should be noted that the lateral chromatic aberration changes when the seventh lens L7 is moved for focus adjustment, but this is inhibited enough that in practice it is not a problem.

The zoom lens of this embodiment is configured such that the following conditional expressions are satisfied.

$$|L_W - L_T|/L_W < 0.1 \tag{1}$$

$$1.9 < f_{G2}/f_W < 2.4 \tag{2}$$

$$3.2 < f_{G3}/f_W < 4.0 \tag{3}$$

$$0.6 < f_3/f_{G2} < 1.1 \tag{4}$$

$$1.5 < f_6/f_{G2} < 1.8 \tag{5}$$

$$n_3 > 1.75 \tag{6}$$

$$v_3 > 35 \tag{7}$$

$$n_4 > 1.6 \quad (8)$$

$$\nu_4 > 45 \quad (9)$$

$$n_6 > 1.7 \quad (10)$$

$$35 < \nu_6 < 50 \quad (11)$$

Here, $L_W$ is the optical total length (length from the apex of the object side surface of the first lens L1 to the image plane) at the wide-angle end, $L_T$ is the optical total length at the tele end, $f_{G2}$ is the combined focal length of the second lens group G2, $f_{G3}$ is the combined focal length of the third lens group G3, $f_W$ is the combined focal length of the overall lens system at the wide-angle end at an object distance of $\infty$, $f_i$ is the focal length of the i-th (i is a natural number) lens, $n_i$ is the refractive index of the i-th lens, and $\nu_i$ is the Abbe number of the i-th lens.

In the zoom lens of this embodiment, it is desirable that the following conditional expression is satisfied.

$$-0.8 < \kappa_{3F} + 8 D_{3F} r_{3F}^3 < -0.5. \quad (12)$$

Here, $\kappa_{3F}$ is the conic constant of the object side surface of the third lens L3, $D_{3F}$ is the fourth-order aspheric coefficient of the object side surface of the third lens L3, and $r_{3F}$ is the paraxial radius of curvature of the object side surface of the third lens L3.

The above conditional expressions are described below.

The Conditional Expression (1) is a conditional expression for reducing the maximum value of the optical total length when in use and for ensuring good image-forming properties. To reduce the maximum value of the optical total length when in use, ideally the optical total length at the wide-angle end and the optical total length at the tele end are made equal. However, when the optical total length at the wide-angle end and the optical total length at the tele end are made completely equal, the image-forming properties may be sacrificed. The above Conditional Expression (1) was arrived at in light of these matters. If the Conditional Expression (1) is not satisfied, then it is difficult to shorten the optical total length when in use and ensure good image-forming properties.

The Conditional Expression (2) is a conditional expression for shortening the optical total length when in use as much as possible and simultaneously correcting with good balance the generation of various aberrations. When $f_{G2}/f_W$ is 2.4 or more, then the conjugate distance of the second lens group G2 (the distance from the object point to the image point) is increased, and this increases the optical total length when in use. In this case, the optical total length is shortened if the magnification of the third lens group G3 is reduced, but because the power of the third lens group G3 becomes large, the curvature of field that is generated by the third lens group G3 is not sufficiently corrected, and it becomes difficult to correct this curvature of field with the first lens group G1 and the second lens group G2. On the other hand, when $f_{G2}/f_W$ is 1.9 or less, the optical total length when in use is short but it is difficult to secure enough air distance at the tele end to dispose the aperture stop A between the first lens group G1 and the second lens group G2.

The Conditional Expression (3) is a conditional expression for making the slant angle of the principal ray at the maximum image height that it is incident on the solid-state imaging element small, that is, making the telecentricity good, and reducing the curvature of field. When $f_{G3}/f_W$ is 3.2 or less, there is good telecentricity but the curvature of field of the overall lens system cannot be corrected. On the other hand, when $f_{G3}/f_W$ is 4.0 or more, the curvature of field is reduced but the telecentricity is insufficient.

The Conditional Expressions (4) and (5) are conditional expressions for correcting with good balance the aberrations generated at the second lens group G2 and for shortening the optical total length of the overall lens system when in use. If $f_3/f_{G2}$ is 1.1 or more, or if $f_6/f_{G2}$ is 1.5 or less, then deviation of the principal point on the object side of the second lens group G2 toward the object side is insufficient, and thus when setting the length from the image plane S side principal point of the first lens group G1 to the object side principal point of the second lens group G2 at the tele end to a desired length, it becomes difficult to ensure enough air space to dispose the aperture stop A between the first lens group G1 and the second lens group G2. On the other hand, if $f_3/f_{G2}$ is 0.6 or less, or if $f_6/f_{G2}$ is 1.8 or more, then there is sufficient deviation of the object side principal point of the second lens group G2 toward the object side, sufficient air distance can be secured at the tele end to dispose the aperture stop A between the first lens group G1 and the second lens group G2, and the optical total length when in use can be shortened, but the power of the fourth lens L4 becomes too great, and this makes it difficult to correct with good balance the spherical aberration and the coma that are generated at the fourth lens L4 using other lenses.

The Conditional Expressions (6) to (11) are conditional expressions for reducing longitudinal chromatic aberration and lateral chromatic aberration when zooming from the wide-angle end to the tele end, and for reducing the curvature of field. If any one of Conditional Expressions (6) to (11) is not satisfied, then problems that may occur include noticeable color blurring at either zoom position due to an increase in the longitudinal chromatic aberration or the lateral chromatic aberration, and the image-forming properties may become worse at some parts of the captured image due to the curvature of field not becoming small.

The Conditional Expression (12) is a conditional expression for regulating the conic constant and the fourth-order aspheric coefficient for the aspherical surface on the object side of the third lens L3 so as to reduce the sensitivity to decentration of the object side surface of the third lens L3 with respect to light rays having a small field angle that pass through the center portion of the aperture stop A. $\kappa_{3F} + 8D_{3F}r_{3F}^3$ expresses the extent of deviation of the aspherical surface from a spherical surface. When $\kappa_{3F} + 8D_{3F}r_{3F}^3$ is $-0.8$ or less, the effects of the aspherical surface reduce the spherical aberration that is generated by the object side surface of the third lens L3, but the decentering coma and the decentering astigmatism that are generated by the object side surface of the third lens L3 become too great, and this increases the sensitivity to decentration of the object side surface of the third lens L3. On the other hand, when $\kappa_{3F} + 8D_{3F}r_{3F}^3$ is $-0.5$ or more, the decentering coma and the decentering astigmatism that are generated by the object side surface of the third lens L3 become small, but the spherical aberration is not sufficiently corrected or the radius of curvature of the image-plane side surface of the fifth lens L5 becomes short, and thus the decentering coma and the decentering astigmatism that are generated by the image-plane side surface of the fifth lens L5 become large, which increases the sensitivity to decentration of the image-plane side surface of the fifth lens L5.

Table 1 below shows specific examples of the numerical values (lens data) of the zoom lens shown in FIG. 1.

TABLE 1

| Group | Element | Surface | R | d | $n_d$ | $v_d$ |
|---|---|---|---|---|---|---|
| G1 | L1 | 1 | 220.428 | 1.500 | 1.75016 | 45.1 |
|  |  | 2 | 5.890* | 2.999 |  |  |
|  | L2 | 3 | 12.359 | 1.630 | 1.84666 | 23.9 |
|  |  | 4 | 31.007 | variable |  |  |
| G2 | Stop | 5 | ∞ | 0.900 |  |  |
|  | L3 | 6 | 6.430* | 1.680 | 1.80431 | 40.9 |
|  |  | 7 | 130.545 | 0.237 |  |  |
|  | L4 | 8 | 10.586 | 1.700 | 1.62299 | 58.1 |
|  | L5 | 9 | −96.073 | 0.700 | 1.84666 | 23.8 |
|  |  | 10 | 4.534 | 0.688 |  |  |
|  | L6 | 11 | 49.920 | 1.200 | 1.80610 | 40.7 |
|  |  | 12 | −23.629 | variable |  |  |
| G3 | L7 | 13 | 14.222 | 1.900 | 1.51459 | 62.6 |
|  |  | 14 | −38.157* | variable |  |  |
|  | P | 15 | ∞ | 2.300 | 1.51680 | 64.2 |
|  |  | 16 | ∞ |  |  |  |

The unit of length in the table is [mm]. In Table 1 above, r is the radius of curvature of the lens, d is the distance between surfaces, and $n_d$ and $v_d$ are the refractive index and the Abbe number of the lens at the d-line, respectively (the same applies for other embodiments described later). It should be noted that surfaces with an * mark are aspheric and that their aspheric shape is defined by Expression 2 shown below (the same applies for other embodiments described later).

$$z = \frac{h^2/r}{1 + \sqrt{1 - (1+\kappa)(h/r)^2}} + Dh^4 + Eh^6 + Fh^8 + Gh^{10} \qquad \text{Expression 2}$$

In Expression 2 shown above, h is the height from the optical axis, z is the sag amount at the point on the aspherical surface where the height from the optical axis is h, κ is the conic constant, and D, E, F and G are the fourth-order, sixth-order, eighth-order and tenth-order aspheric coefficients, respectively.

Table 2 below shows the conic constant and the aspheric coefficients (aspheric data) of the zoom lens shown in FIG. 1.

TABLE 2

|  | Second Surface | Sixth Surface | Fourteenth Surface |
|---|---|---|---|
| κ | −0.796896 | −0.144654 | 0.0 |
| D | $1.25832 \times 10^{-6}$ | $-2.20926 \times 10^{-4}$ | $1.69331 \times 10^{-4}$ |
| E | $1.19237 \times 10^{-6}$ | $-4.46557 \times 10^{-6}$ | $-1.68788 \times 10^{-5}$ |
| F | $-5.76048 \times 10^{-8}$ | $1.48953 \times 10^{-7}$ | $6.28843 \times 10^{-7}$ |
| G | $1.06614 \times 10^{-9}$ | $-1.17063 \times 10^{-8}$ | $-8.52576 \times 10^{-9}$ |

Table 3 below shows the variable distance between surfaces (in mm) (variable surface spacing data) when the object distance of the zoom lens shown in FIG. 1 is ∞. In Table 3, f (mm) and 2ω represent the focal length and the field angle, respectively (the same applies for other embodiments described later).

TABLE 3

| Surface Spacing | Wide-angle End | Intermediate Position | Tele End |
|---|---|---|---|
| $d_4$ | 14.738 | 6.884 | 1.300 |
| $d_{12}$ | 3.992 | 10.664 | 18.939 |
| $d_{14}$ | 2.812 | 1.508 | 1.304 |
| f | 5.815 | 10.067 | 17.416 |
| F value | 2.80 | 3.77 | 5.21 |
| 2ω | 65.7° | 39.6° | 23.2° |
| L | 40.066 | 37.580 | 40.066 |

Here, when $f_W$ is the combined focal length of the entire lens system at the wide-angle end and $f_T$ is the combined focal length of the entire lens system at the tele end when the object distance is ∞, then the zoom position at which the focal length is $$f_N = (f_W f_T)^{1/2}$$

is called the "intermediate position."

Figure 2:
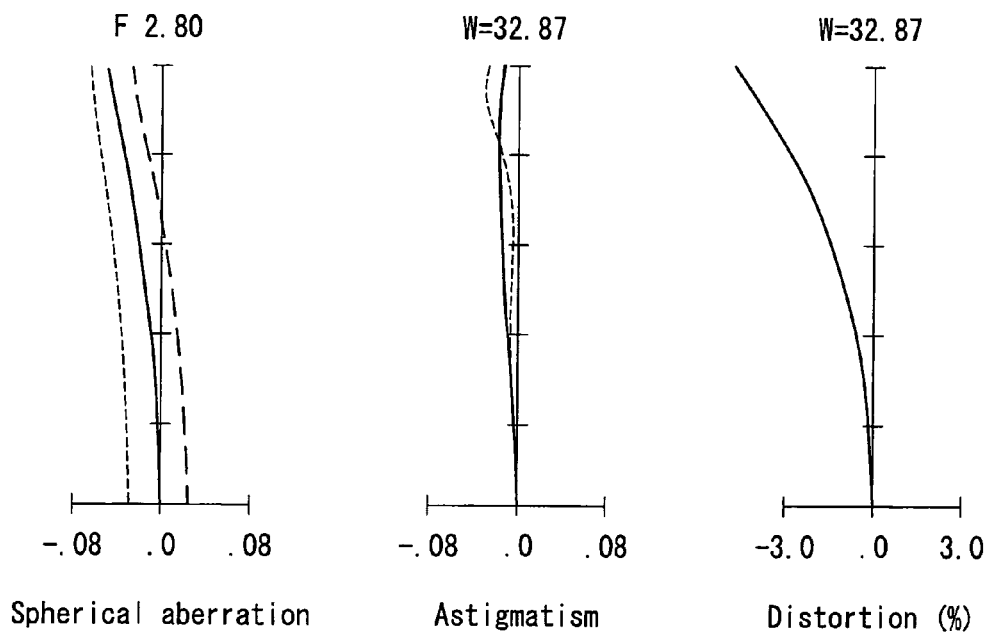
FIG. 2 shows aberration graphs for the wide-angle end of the zoom lens according to the first embodiment of the present invention.
Figure 3:
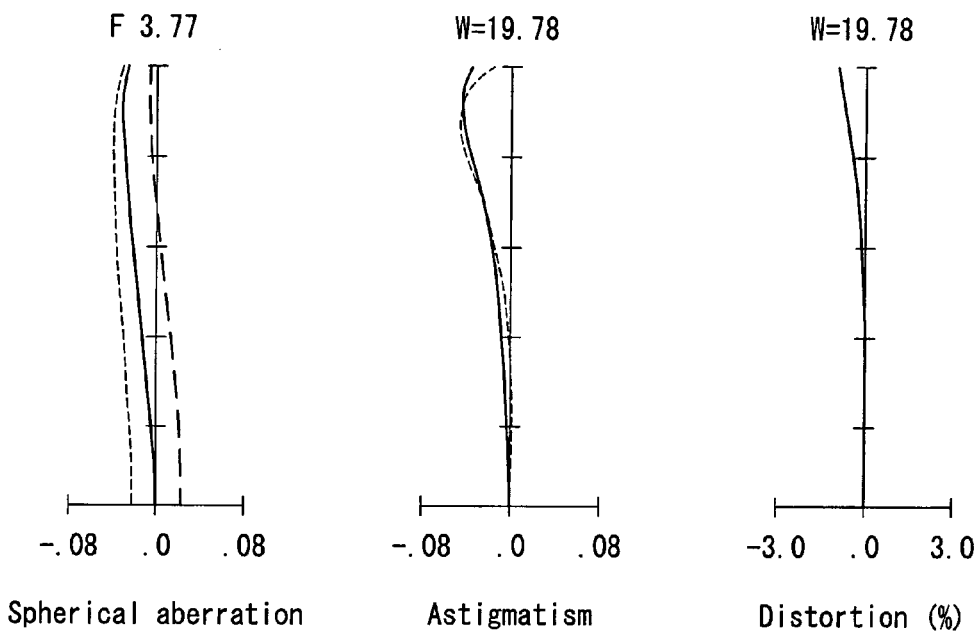
FIG. 3 shows aberration graphs for the intermediate position of the zoom lens according to the first embodiment of the present invention.
Figure 4:
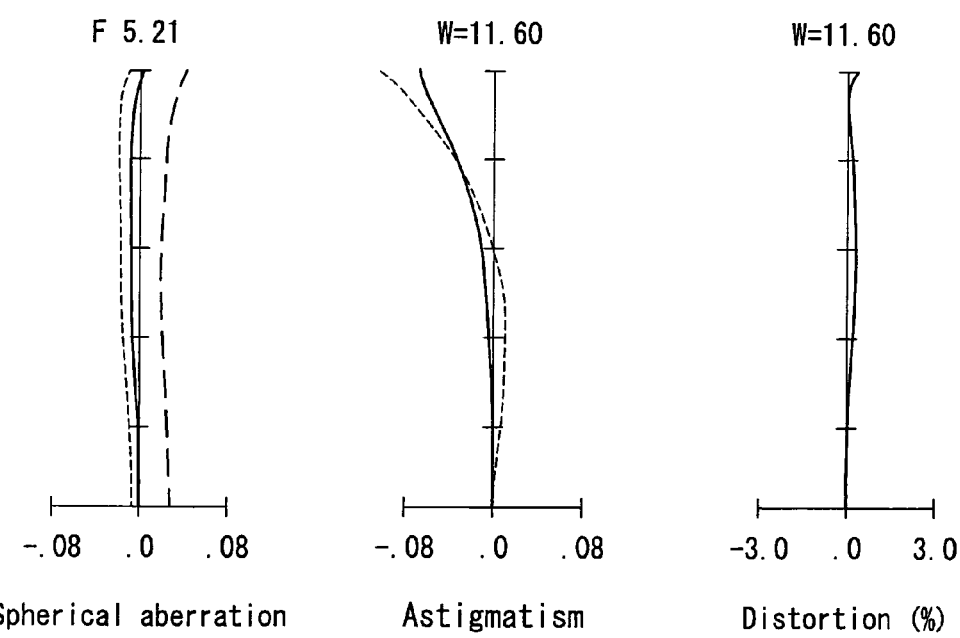
FIG. 4 shows aberration graphs for the tele end of the zoom lens according to the first embodiment of the present invention.

FIGS. 2, 3 and 4 are aberration graphs (spherical aberration, astigmatism and distortion) of the zoom lens shown in FIG. 1 when the aperture stop is open and the object distance is ∞. FIG. 2 is the case for the wide-angle end, FIG. 3 is the case for the intermediate position, and FIG. 4 is the case for the tele end. It should be noted that in the spherical aberration diagrams, the solid line indicates characteristics at the d-line, the short dashed line indicates characteristics at the F-line, and the long dashed line indicates characteristics at the C-line. Also, in the astigmatism diagrams, the solid line indicates the sagittal curvature of field and the dashed line indicates the meridional curvature of field (the same applies for other embodiments described later).

It is clear from the aberration graphs shown in FIGS. 2 to 4 that the zoom lens of this embodiment demonstrates good aberration properties even if the zoom position is changed.

If the zoom lens shown in FIG. 1 is packaged in an electronic still camera, then as the solid-state imaging element it is possible to use an element whose recording pixel number is 2048 (horizontal)×1536 (vertical) (approximately 3 million pixels), whose pixel pitch is 2.8 μm (horizontal)× 2.8 μm (vertical), and whose recording picture size is 5.7344 mm (horizontal)×4.3008 mm (vertical). As the solid-state imaging element, it is also possible to use an element in which a miniature positive lens is provided at each pixel in order to increase the effective aperture ratio.

In the zoom lens shown in FIG. 1, the three lenses of the third lens L3 to the fifth lens L5 in the second lens group G2 are highly sensitive to decentration. Accordingly, in the zoom lens of this embodiment, the fourth lens L4 and the fifth lens L5 are cemented and the fifth lens L5 and the sixth lens L6 are in contact with one another outside their effective diameters. Additionally, the surface of the third lens L3 on the image plane side is a concave surface so that the third lens L3 can be centered easily during assembly.

When the fourth lens L4 and the fifth lens L5 are cemented, the refractive index difference at the border of the two surfaces of the adhesive agent is reduced, thus lowering the sensitivity to decentration of the image plane side surface of the fourth lens L4 and the object side surface of the fifth lens L5. Also, when the fifth lens L5 and the sixth lens L6 are in contact with one another outside their effective diameters, the decentration between the image plane side surface of the fifth lens L5 and the object side surface of the sixth lens L6 is reduced. Also, since the lenses are cemented and in contact with one another, the need for spacers, which easily lead to the occurrence of error in the surface spacing, is eliminated. Thus compared to a case in which spacers are used, error in the surface spacing can be reduced.

To carry out lens alignment, the following can be performed. That is, first, the fourth lens L4 and the fifth lens L5 are cemented and together with the sixth lens L6 are incorporated into the lens frame, after which the third lens L3 is attached to a predetermined position and an decentration measuring device is used to adjust the position of the third lens L3 so that the state of decentration of the entire second lens group G2 is small. Lastly, the third lens L3 is fixed to the lens frame using an adhesive agent. At this time, if the image plane side surface of the third lens L3 is a convex surface, then when the third lens L3 is moved, both parallel decentration (decenter) and tilt decentration (tilt) occur, making lens alignment difficult. On the other hand, in the zoom lens shown in FIG. 1, the image plane side surface of the third lens L3 is the concave surface, and thus the third lens L3 can be parallel displaced without being tilted, making lens alignment easy. It should be noted that the image plane side surface of the third lens L3 can also be a flat surface, and in this case as well, lens alignment is easy.

As described above, the zoom lens shown in FIG. 1 has a zoom ratio of approximately ×3.0 at an object distance of ∞, a field angle at the wide-angle end of approximately 66°, high resolution, and a short optical total length when not in use.

SECOND EMBODIMENT

Figure 5:
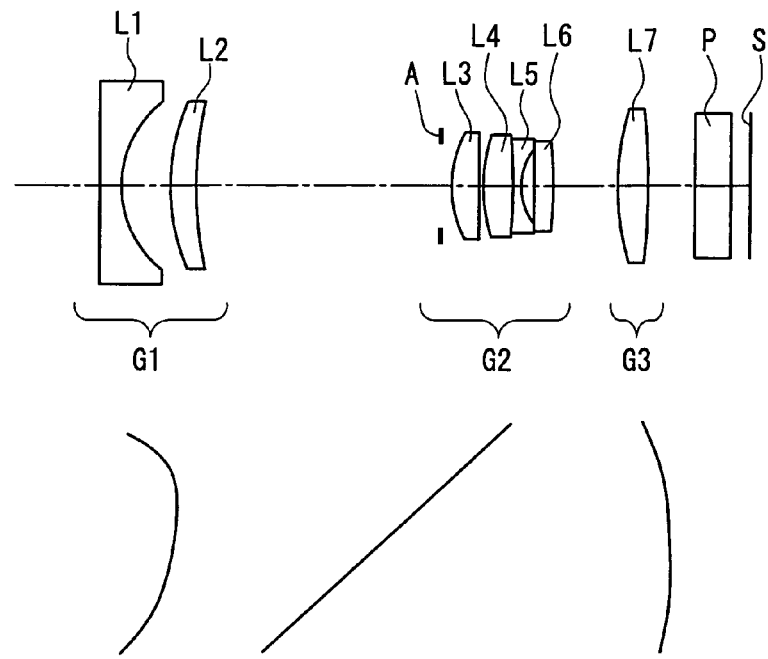
FIG. 5 is a layout drawing showing the configuration of a zoom lens according to a second embodiment of the present invention.

FIG. 5 is a layout drawing showing the configuration of a zoom lens according to a second embodiment of the present invention. This zoom lens is configured such that the resolution is high, the optical total length when collapsed is short, and the sensitivity to decentration is lower than in the zoom lens according to the first embodiment.

As shown in FIG. 5, the zoom lens of this embodiment is made of a first lens group G1 having a negative power, a second lens group G2 having a positive power, and a third lens group G3 having a positive power, arranged in that order from the object side (left side in FIG. 5) to the image plane S side (right side in FIG. 5), and includes seven lenses. An aperture stop A is fixed on the object side of the second lens group G2, and moves in the direction of the optical axis together with the second lens group G2.

The zoom lens shown in FIG. 5 has the same configuration as the zoom lens shown in the first embodiment, and is different only in the material of some of the lenses. That is, in the zoom lens shown in this embodiment, the fourth lens L4, the sixth lens L6 and the seventh lens L7 are set to have higher refractive indices than in the zoom lens described in the first embodiment.

If the lens surfaces of the lenses making up the zoom lens are decentered, then there is the problem that the image-forming properties drop in some regions on the imaging surface of the solid-state imaging element. Many of the lens surfaces of the lenses making up the second lens group G2 are highly sensitive to decentration, and in particular, the object side surface of the third lens L3 and the image plane S side surface of the fifth lens L5 easily become very sensitive to decentration.

In response to this problem, the inventors of the present application independently evaluated third-order aberration when the lens surfaces of the lenses of the zoom lens were decentered, and moreover performed an analysis of the third-order decentering coma and the third-order decentering astigmatism. The results showed that to lower the sensitivity to decentration of the lens surfaces of the lenses of the zoom lens, the ratio of the decentering coma that occurs at the lens surfaces to the amount of decentration of those lens surfaces (the surface coefficient of the decentering coma), and the ratio of the decentering astigmatism that occurs at the lens surfaces to the amount of decentration of those lens surfaces (the surface coefficient of the decentering astigmatism) can be reduced. It was also found that it may be possible to improve the image-forming properties on the imaging surface (image plane S) of the solid-state imaging element by suitably tilting the solid-state imaging element if the surface coefficients of the decentering coma and the decentering astigmatism that occur at the lens surfaces are both small and the amount of decentration of the lens surfaces is small.

Using the results of the above analysis, it was found that to lower the sensitivity to decentration of the object side surface of the third lens L3 and the image plane side surface of the fifth lens L5, it is possible to reduce the incidence angle if the axial light that passes through the edge of the aperture stop A is incident on the lens surface through air or the refraction angle in air if that axial light is emitted from the lens surface into the air. Accordingly, in this embodiment, the refractive index of the fourth lens L4 is increased, and thus the radius of curvature of the object side surface of the third lens L3 is made larger. Also, the refractive index of the sixth lens L6 and the refractive index of the seventh lens L7 are increased so that leeway is given to the Petzval sum, and utilizing this leeway, the radius of curvature of the image plane side surface of the fifth lens L5 is made large.

The result of performing the above is that the sensitivity to decentration of the object side surface of the third lens L3 and of the image plane side surface of the fifth lens L5 of the zoom lens shown in FIG. 5 is lower than the sensitivity to decentration of those lens surfaces of the zoom lens shown in FIG. 1.

In the zoom lens shown in FIG. 5, if the lens surfaces have only minute decentration, then by tilting the solid-state imaging element the image-forming properties on the imaging surface of the solid-state imaging element can be favorably corrected. However, if the amount of decentration of the lens surfaces is large or if the decentration of the lens surfaces leads to an increase in the decentering coma and the decentering astigmatism of the overall lens system, then the image-forming properties remain poor at some regions of the imaging surface of the sold-state imaging element, and thus there is a limit to this method of tilting the solid-state imaging element.

In the zoom lens of this embodiment, like the zoom lens according to the first embodiment, the optical total length when collapsed and the optical total length when in use can both be shortened.

The zoom lens of this embodiment is configured such that the following conditional expressions are satisfied.

$|L_W - L_T|/L_W < 0.1$ (1)

$1.9 < f_{G2}/f_W < 2.4$ (2)

$3.2 < f_{G3}/f_W < 4.0$ (3)

$0.6 < f_3/f_{G2} < 1.1$ (4)

$1.5 < f_6/f_{G2} < 1.8$ (5)

$n_3 > 1.75$ (6)

$v_3 > 35$ (7)

$n_4 > 1.6$ (8)

$$\nu_4 > 45 \quad (9)$$

$$n_6 > 1.7 \quad (10)$$

$$35 < \nu_6 < 50 \quad (11)$$

In the zoom lens of this embodiment, it is also desirable that the following conditional expression is satisfied.

$$-0.8 < \kappa_{3F} + 8D_{3F}r_{3F}^3 < -0.5. \quad (12)$$

Here, $L_W$ is the optical total length (length from the apex of the object side surface of the first lens L1 to the image plane) at the wide-angle end, $L_T$ is the optical total length at the tele end, $f_{G2}$ is the combined focal length of the second lens group G2, $f_{G3}$ is the combined focal length of the third lens group G3, $f_W$ is the combined focal length of the overall lens system at the wide-angle end at an object distance of ∞, $f_i$ is the focal length of the i-th (i is a natural number) lens, $n_i$ is the refractive index of the i-th lens, $\nu_i$ is the Abbe number of the i-th lens, $r_{3F}$ is the paraxial radius of curvature of the object side surface of the third lens L3, $\kappa_{3F}$ is the conic constant of the object side surface of the third lens L3, and $D_{3F}$ is the fourth-order aspheric coefficient of the object side surface of the third lens L3.

The above conditional expressions are described below.

The above Conditional Expressions (1) to (7) and (9) to (12) are that same as those described above in the first embodiment. It should be noted that the lower limit of the Conditional Expression (8') is larger than the lower limit of the Conditional Expression (8) described above in the first embodiment. This is in order to reduce the longitudinal chromatic aberration and the lateral chromatic aberration when zooming from the wide-angle end to the tele end and also to reduce the curvature of field and simultaneously to effectively obtain the effect of reducing the sensitivity to decentration of the object side surface of the fourth lens L4.

Table 4 below shows specific examples of the numerical values of the zoom lens shown in FIG. 5.

TABLE 4

| Group | Element | Surface | r | d | $n_d$ | $\nu_d$ |
|---|---|---|---|---|---|---|
| G1 | L1 | 1 | 225.905 | 1.500 | 1.75016 | 45.1 |
|  |  | 2 | 5.766* | 2.663 |  |  |
|  | L2 | 3 | 11.648 | 1.630 | 1.84666 | 23.8 |
|  |  | 4 | 30.495 | variable |  |  |
| G2 | Stop | 5 | ∞ | 0.900 |  |  |
|  | L3 | 6 | 7.161* | 1.680 | 1.80431 | 40.9 |
|  |  | 7 | 126.608 | 0.489 |  |  |
|  | L4 | 8 | 11.950 | 1.870 | 1.74330 | 49.2 |
|  | L5 | 9 | −27.949 | 0.700 | 1.84666 | 23.8 |
|  |  | 10 | 5.026 | 0.629 |  |  |
|  | L6 | 11 | 84.504 | 1.200 | 1.83400 | 37.3 |
|  |  | 12 | −20.572 | variable |  |  |
| G3 | L7 | 13 | 16.576* | 1.900 | 1.66556 | 54.8 |
|  |  | 14 | −67.979 | variable |  |  |
|  | P | 15 | ∞ | 2.300 | 1.51680 | 64.2 |
|  |  | 16 | ∞ |  |  |  |

Table 5 below shows the conic constant and the aspheric coefficients of the zoom lens shown in FIG. 5.

TABLE 5

|  | Second Surface | Sixth Surface | Thirteenth Surface |
|---|---|---|---|
| κ | −0.817589 | −0.103669 | 0.0 |
| D | $3.43794 \times 10^{-5}$ | $-1.80096 \times 10^{-4}$ | $-8.69685 \times 10^{-5}$ |
| E | $3.12408 \times 10^{-7}$ | $-9.49587 \times 10^{-6}$ | $7.80173 \times 10^{-6}$ |
| F | $-1.38434 \times 10^{-8}$ | $1.06823 \times 10^{-6}$ | $-2.22915 \times 10^{-7}$ |
| G | $3.13288 \times 10^{-10}$ | $-5.88664 \times 10^{-8}$ | $1.51594 \times 10^{-9}$ |

Also, Table 6 below shows the variable distance between surfaces (in mm) when the object distance of the zoom lens shown in FIG. 5 is ∞.

TABLE 6

| Surface Spacing | Wide-angle End | Intermediate Position | Tele End |
|---|---|---|---|
| $d_4$ | 14.832 | 6.799 | 1.097 |
| $d_{12}$ | 4.051 | 10.600 | 18.856 |
| $d_{14}$ | 2.890 | 1.750 | 1.820 |
| f | 5.817 | 10.072 | 17.423 |
| F value | 2.80 | 3.74 | 5.12 |
| 2ω | 65.7° | 39.5° | 23.2° |
| L | 40.324 | 37.700 | 40.324 |

Figure 6:
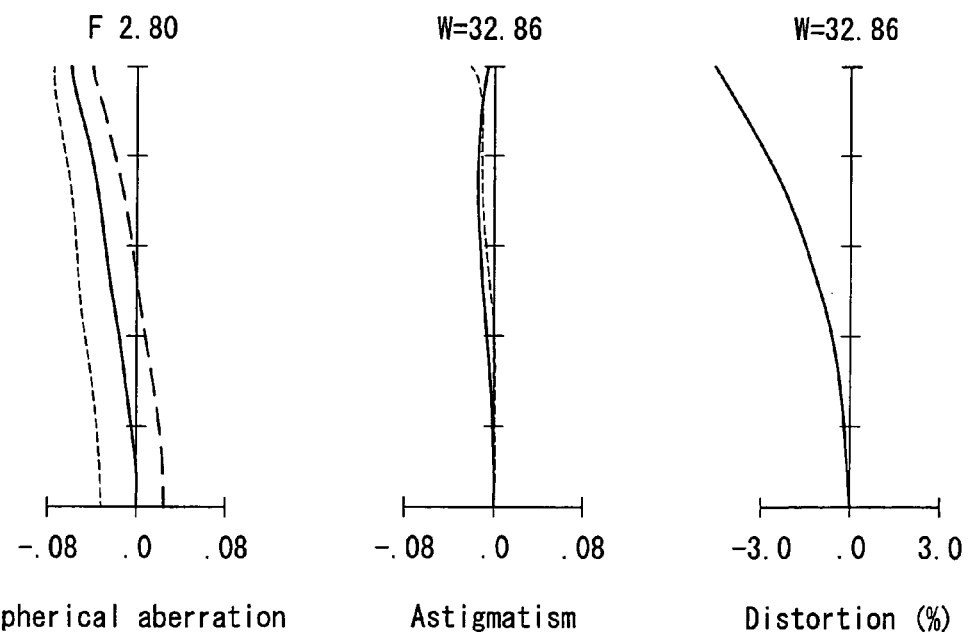
FIG. 6 shows aberration graphs for the wide-angle end of the zoom lens according to the second embodiment of the present invention.
Figure 7:
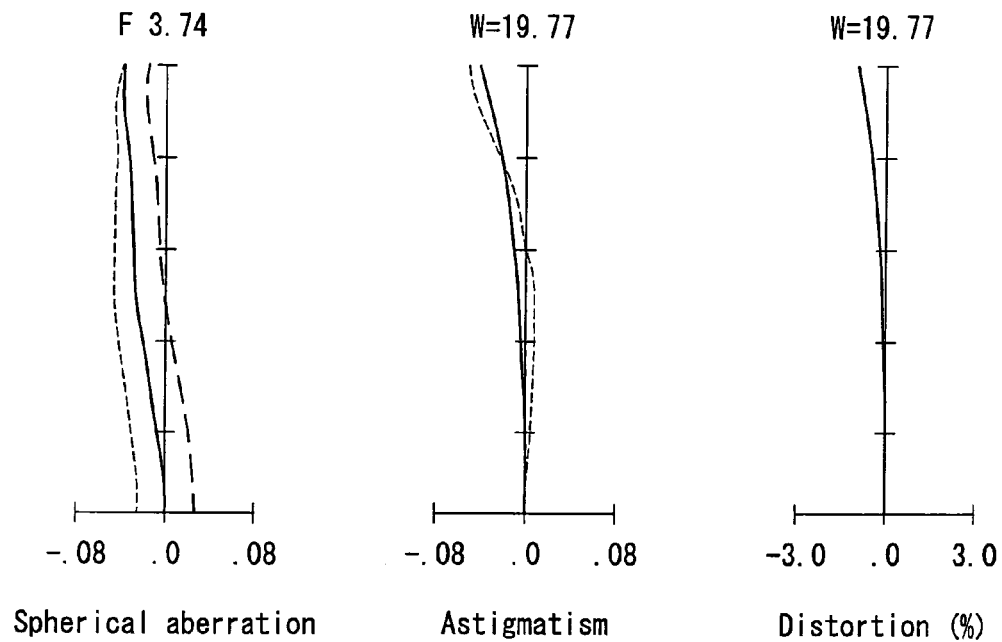
FIG. 7 shows aberration graphs for the intermediate position of the zoom lens according to the second embodiment of the present invention.
Figure 8:
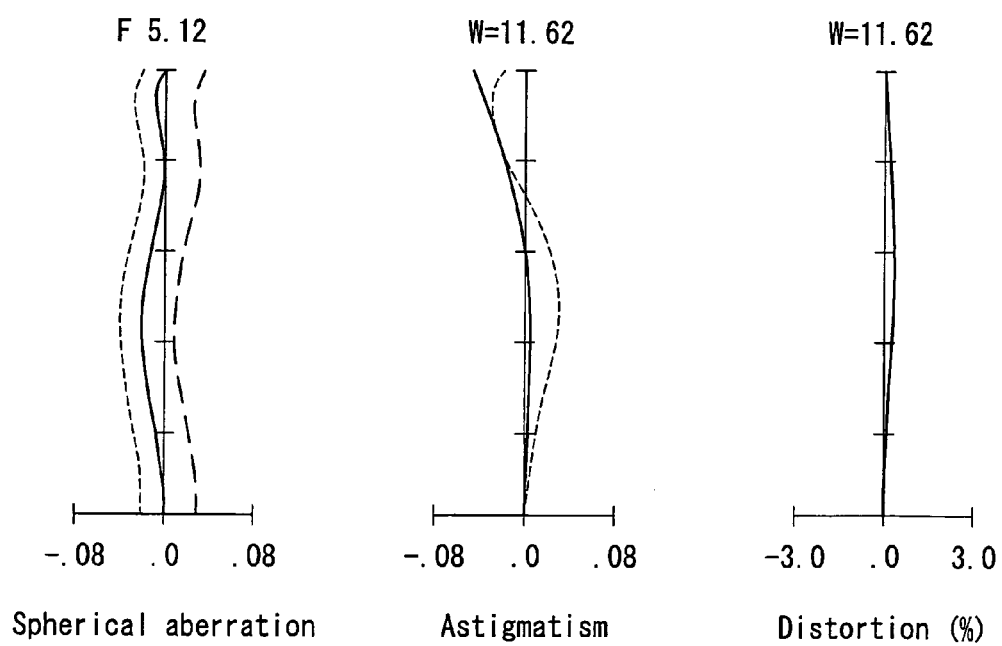
FIG. 8 shows aberration graphs for the tele end of the zoom lens according to the second embodiment of the present invention.

FIGS. 6 to 8 are aberration graphs (spherical aberration, astigmatism, and distortion) of the zoom lens shown in FIG. 5 when the object distance is ∞ and the aperture stop is fully open. FIG. 6 shows the case for the wide-angle end, FIG. 7 shows the case for the intermediate position, and FIG. 8 shows the case for the tele end.

It is clear from the aberration graphs shown in FIGS. 6 to 8 that the zoom lens of this embodiment demonstrates good aberration properties even if the zoom position is changed.

If the zoom lens shown in FIG. 5 is packaged in an electronic still camera, then the same solid-state imaging element described in the first embodiment can be used.

Since the image plane side surface of the third lens L3 is a concave surface, if necessary, the third lens L3 can be aligned easily during assembly, as described in the first embodiment. Also, if the image-forming properties are not good at some regions on the imaging surface (image plane S) of the solid-state imaging element, then the solid-state imaging element can be tilted by 1° or less to improve the image-forming properties on the imaging surface (image plane S) of the solid-state imaging element.

As described above, the zoom lens shown in FIG. 5 has a zoom ratio of approximately ×3.0 at an object distance of ∞, a field angle at the wide-angle end of approximately 66°, high resolution, a short optical total length when not in use, and low sensitivity to decentration.

THIRD EMBODIMENT

Figure 9:
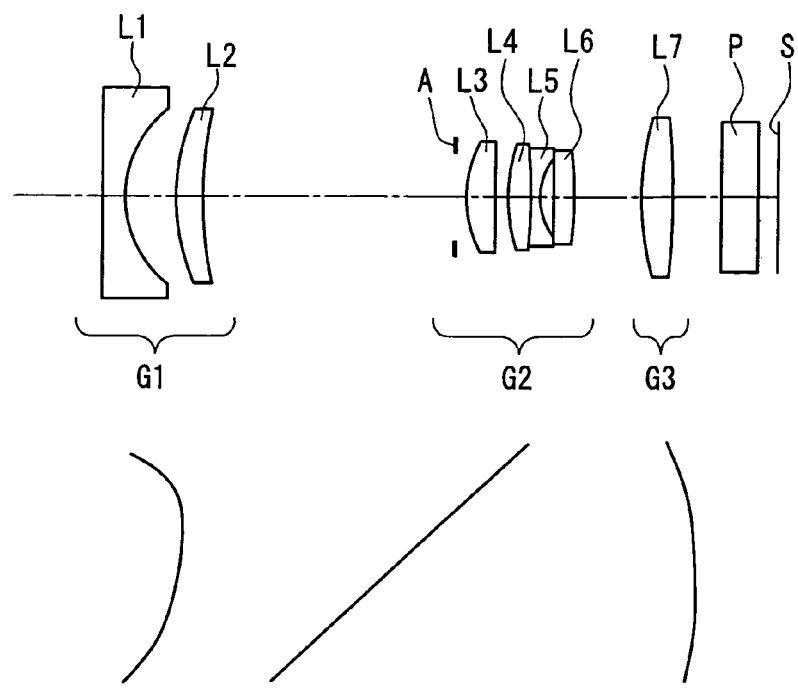
FIG. 9 is a layout drawing showing the configuration of a zoom lens according to a third embodiment of the present invention.

FIG. 9 is a layout drawing showing the configuration of a zoom lens according to a third embodiment of the present invention. This zoom lens is configured such that the resolution is high, the optical total length when collapsed is short, and the sensitivity to decentration is low.

As shown in FIG. 9, the zoom lens of this embodiment is made of a first lens group G1 having a negative power, a second lens group G2 having a positive power, and a third lens group G3 having a positive power, arranged in that order from the object side (left side in FIG. 9) to the image plane S side (right side in FIG. 9), and includes seven lenses. An aperture stop A is fixed on the object side of the second lens group G2, and moves in the direction of the optical axis together with the second lens group G2.

The zoom lens shown in FIG. 9 has the same configuration as the zoom lens shown in the second embodiment, and is different only in the material of some of the lenses. That is, in the zoom lens shown in this embodiment, the fourth lens L4 is set to have a higher refractive index than in the zoom lens described in the second embodiment.

In order to obtain better optical properties, the zoom lens of this embodiment also is configured such that the conditional expressions (1) to (7), (8'), and (9) to (12) described above in the second embodiment are satisfied.

Table 7 below shows specific examples of the numerical values of the zoom lens shown in FIG. 9.

TABLE 7

| Group | Element | Surface | r | d | $n_d$ | $v_d$ |
|---|---|---|---|---|---|---|
| G1 | L1 | 1 | 206.431 | 1.500 | 1.75016 | 45.1 |
|  |  | 2 | 5.701* | 2.641 |  |  |
|  | L2 | 3 | 11.480 | 1.730 | 1.84666 | 23.8 |
|  |  | 4 | 29.922 | variable |  |  |
| G2 | Stop | 5 | ∞ | 0.900 |  |  |
|  | L3 | 6 | 7.625* | 1.680 | 1.80431 | 40.9 |
|  |  | 7 | 97.314 | 0.954 |  |  |
|  | L4 | 8 | 11.929 | 1.400 | 1.77250 | 49.6 |
|  | L5 | 9 | −35.487 | 0.700 | 1.84666 | 23.8 |
|  |  | 10 | 5.473 | 0.657 |  |  |
|  | L6 | 11 | ∞ | 1.200 | 1.83400 | 37.3 |
|  |  | 12 | −17.928 | variable |  |  |
| G3 | L7 | 13 | 17.116* | 1.800 | 1.66556 | 54.8 |
|  |  | 14 | −86.399 | variable |  |  |
|  | P | 15 | ∞ | 2.300 | 1.51680 | 64.2 |
|  |  | 16 | ∞ |  |  |  |

Table 8 below shows the conic constant and the aspheric coefficients of the zoom lens shown in FIG. 9.

TABLE 8

| | Second Surface | Sixth Surface | Thirteenth Surface |
|---|---|---|---|
| κ | −0.780185 | −0.172315 | 0.0 |
| D | $7.44081 \times 10^{-6}$ | $-1.48634 \times 10^{-4}$ | $-7.76937 \times 10^{-5}$ |
| E | $4.90696 \times 10^{-7}$ | $-4.38984 \times 10^{-6}$ | $8.93374 \times 10^{-6}$ |
| F | $-2.44580 \times 10^{-8}$ | $3.50644 \times 10^{-7}$ | $-4.34486 \times 10^{-7}$ |
| G | $3.97293 \times 10^{-10}$ | $-1.69741 \times 10^{-8}$ | $8.55719 \times 10^{-9}$ |

Also, Table 9 below shows the variable distance between surfaces (in mm) when the object distance of the zoom lens shown in FIG. 9 is ∞.

TABLE 9

| Surface Spacing | Wide-angle End | Intermediate Position | Tele End |
|---|---|---|---|
| $d_4$ | 16.026 | 7.298 | 1.650 |
| $d_{12}$ | 4.612 | 11.097 | 20.149 |
| $d_{14}$ | 3.260 | 2.397 | 2.099 |
| f | 5.816 | 10.069 | 17.425 |
| F value | 2.77 | 3.64 | 5.02 |
| 2ω | 65.7° | 39.6° | 23.2° |
| L | 42.450 | 39.344 | 42.450 |

Figure 10:
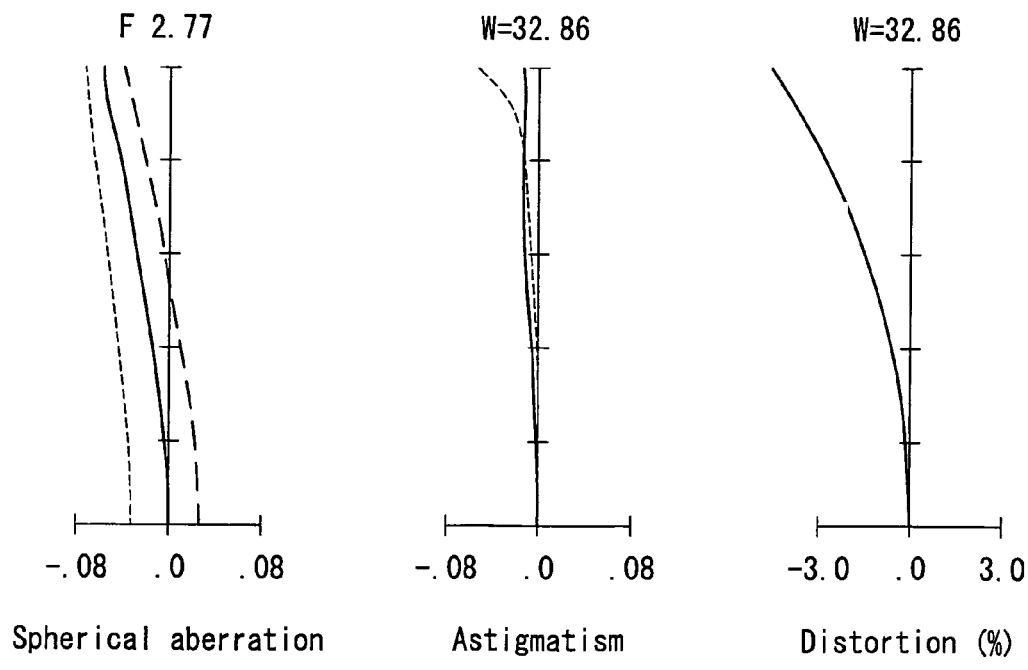
FIG. 10 shows aberration graphs for the wide-angle end of the zoom lens according to the third embodiment of the present invention.
Figure 11:
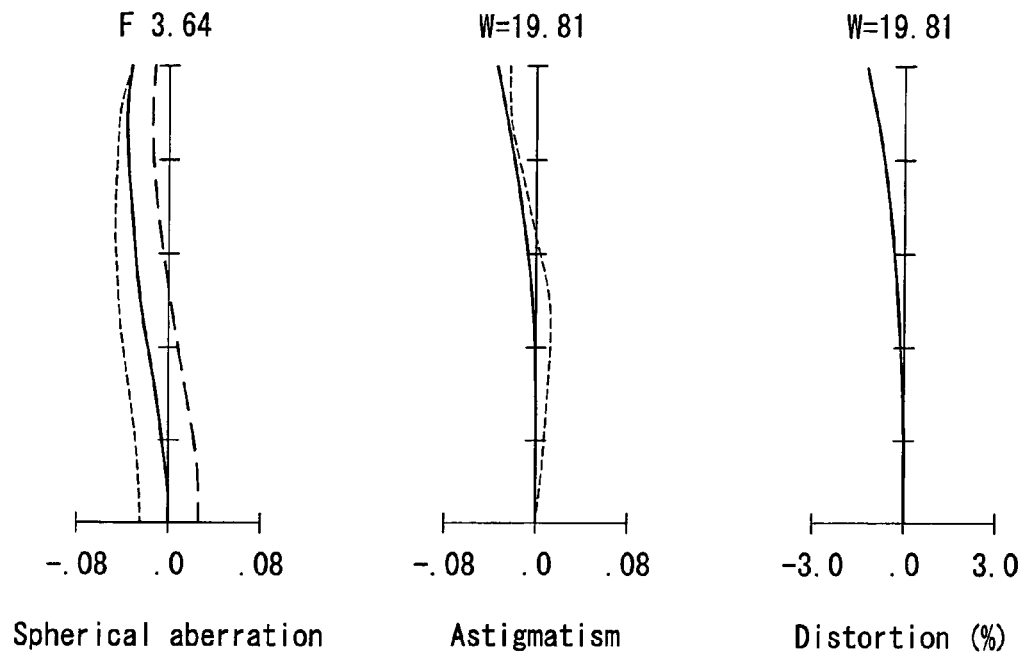
FIG. 11 shows aberration graphs for the intermediate position of the zoom lens according to the third embodiment of the present invention.
Figure 12:
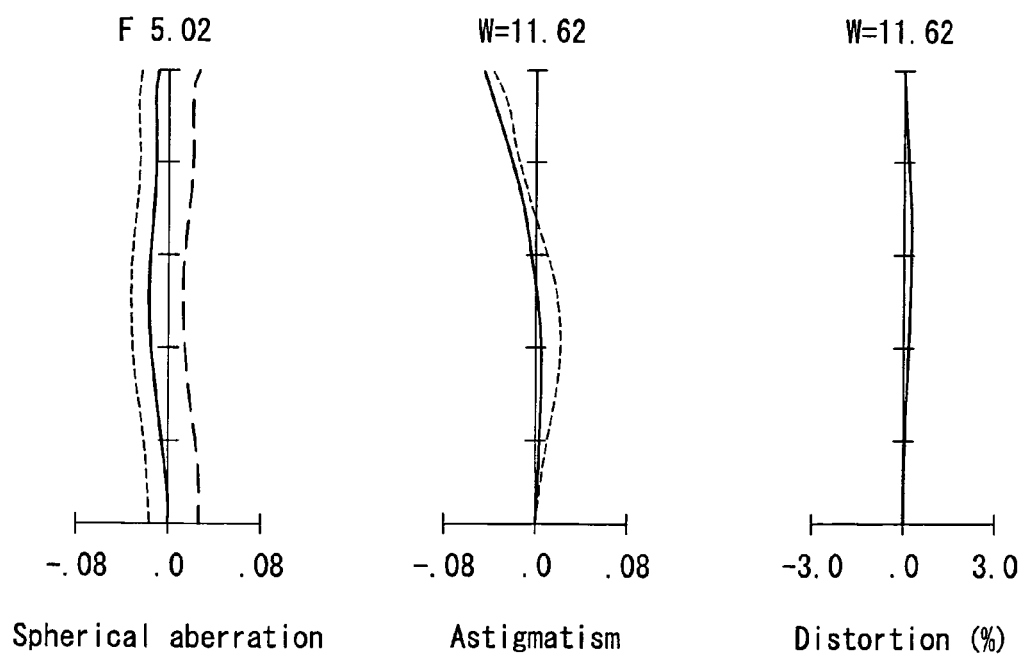
FIG. 12 shows aberration graphs for the tele end of the zoom lens according to the third embodiment of the present invention.

FIGS. 10, 11, and 12 are aberration graphs (spherical aberration, astigmatism, and distortion) of the zoom lens shown in FIG. 9 when the object distance is ∞ and the aperture stop is fully open. FIG. 10 shows the case for the wide-angle end, FIG. 11 shows the case for the intermediate position, and FIG. 12 shows the case for the tele end.

It is clear from the aberration graphs shown in FIGS. 10 to 12 that the zoom lens of this embodiment demonstrates good aberration properties even if the zoom position is changed. It should be noted that although the distortion at the wide-angle end is slightly large, the image-forming properties at high-frequency spatial frequencies are good over the overall captured image.

If the zoom lens shown in FIG. 9 is packaged in an electronic still camera, then the same solid-state imaging element described in the first embodiment can be used.

Since the image plane side surface of the third lens L3 is a concave surface, if necessary, the third lens L3 can be aligned easily during assembly as described in the first embodiment. Also, if the image-forming properties are not good at some regions on the imaging surface (image plane S) of the solid-state imaging element, then the solid-state imaging element can be tilted by 1° or less to improve the image-forming properties on the imaging surface (image plane S) of the solid-state imaging element.

As described above, the zoom lens shown in FIG. 9 has a zoom ratio of approximately ×3.0 at an object distance of ∞, a field angle at the wide-angle end of approximately 66°, high resolution, a short optical total length when not in use, and low sensitivity to decentration.

FOURTH EMBODIMENT

Figure 13:
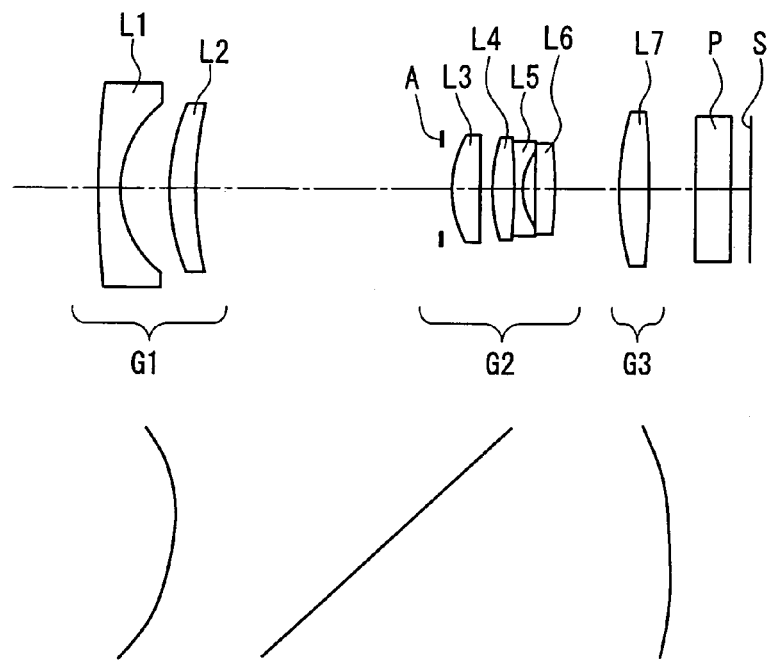
FIG. 13 is a layout drawing showing the configuration of a zoom lens according to a fourth embodiment of the present invention.

FIG. 13 is a layout drawing showing the configuration of a zoom lens according to a fourth embodiment of the present invention. This zoom lens is configured such that the resolution is high, the optical total length when collapsed is short, the sensitivity to decentration is low, and the distortion is good.

As shown in FIG. 13, the zoom lens of this embodiment is made of a first lens group G1 having a negative power, a second lens group G2 having a positive power, and a third lens group G3 having a positive power, arranged in that order from the object side (left side in FIG. 13) to the image plane S side (right side in FIG. 13), and includes seven lenses. An aperture stop A is fixed on the object side of the second lens group G2, and moves in the direction of the optical axis together with the second lens group G2.

The zoom lens shown in FIG. 13 has the same configuration as the zoom lens shown in the third embodiment, except that the lens data are slightly different. That is, primarily, in the zoom lens shown in FIG. 13, the radius of curvature of the object side surface of the first lens L1 is reduced so that the absolute value of the distortion at the wide-angle end is reduced.

In order to obtain better optical properties, the zoom lens of this embodiment is configured such that the conditional expressions (1) to (7), (8'), and (9) to (12) described above in the second embodiment are satisfied, and furthermore, that the following conditional expressions are also satisfied $$9 < r_{1F}/f_W < 13 \quad (13)$$

$$3.8 < r_{2R}/f_W < 4.7. \quad (14)$$

Here, $r_{1F}$ is the radius of curvature of the object side surface of the first lens L1 and $r_{2R}$ is the radius of curvature of the image plane S side surface of the second lens L2.

Conditional Expression (13) is for reducing the negative distortion at the wide-angle end by regulating the radius of curvature of the object side surface of the first lens L1. If $r_{1F}/f_W$ is 9 or less, then the negative distortion at the wide-angle end is small but the coma and the astigmatism become too large, making it difficult to improve the image-forming properties of the peripheral portion of the captured image. On the other hand, if $r_{1F}/f_W$ is 13 or more, then it is difficult to reduce the negative distortion at the wide-angle end with the lens surface of the subsequent lens.

Conditional Expression (14) is for reducing the negative distortion at the wide-angle end by regulating the radius of curvature of the image plane side surface of the second lens L2 once Conditional Expression (13) has been satisfied. If $r_{2R}/f_W$ is 3.8 or less, then the absolute value of the distortion at the wide-angle end is small but the coma and the astigmatism become too large, making it difficult to improve the image-forming properties at the peripheral portions of the capture image. On the other hand, if $r_{2R}/f_W$ is 4.7 or more, then it is difficult to reduce the negative distortion at the wide-angle end with the lens surface of the subsequent lens.

Table 10 below shows specific examples of the numerical values of the zoom lens shown in FIG. 13.

TABLE 10

| Group | Element | Surface | r | d | $n_d$ | $v_d$ |
|---|---|---|---|---|---|---|
| G1 | L1 | 1 | 61.136 | 1.500 | 1.75016 | 45.1 |
|  |  | 2 | 5.435* | 2.630 |  |  |
|  | L2 | 3 | 10.744 | 1.730 | 1.84666 | 23.8 |
|  |  | 4 | 24.549 | variable |  |  |
| G2 | Stop | 5 | ∞ | 0.900 |  |  |
|  | L3 | 6 | 7.890* | 1.680 | 1.80431 | 40.9 |
|  |  | 7 | 42.884 | 1.076 |  |  |
|  | L4 | 8 | 9.227 | 1.400 | 1.77250 | 49.6 |
|  | L5 | 9 | −78.853 | 0.600 | 1.84666 | 23.8 |
|  |  | 10 | 5.313 | 0.635 |  |  |
|  | L6 | 11 | 76.126 | 1.200 | 1.83400 | 37.3 |
|  |  | 12 | −23.315 | variable |  |  |
| G3 | L7 | 13 | 15.967* | 1.800 | 1.66556 | 54.8 |
|  |  | 14 | −104.750 | variable |  |  |
|  | P | 15 | ∞ | 2.100 | 1.51680 | 64.2 |
|  |  | 16 | ∞ |  |  |  |

Table 11 below shows the conic constant and the aspheric coefficients of the zoom lens shown in FIG. 13.

TABLE 11

|  | Second Surface | Sixth Surface | Thirteenth Surface |
|---|---|---|---|
| κ | −0.742687 | −0.604891 | 0.682611 |
| D | $1.45088 \times 10^{-5}$ | $-8.66906 \times 10^{-6}$ | $-1.27919 \times 10^{-4}$ |
| E | $1.70813 \times 10^{-6}$ | $1.37873 \times 10^{-6}$ | $8.92286 \times 10^{-6}$ |
| F | $-6.25193 \times 10^{-8}$ | $-8.55598 \times 10^{-8}$ | $-4.14031 \times 10^{-7}$ |
| G | $7.91262 \times 10^{-10}$ | $8.53680 \times 10^{-10}$ | $7.67921 \times 10^{-9}$ |

Also, Table 12 below shows the variable distance between surfaces (in mm) when the object distance of the zoom lens shown in FIG. 13 is ∞.

TABLE 12

| Surface Spacing | Wide-angle End | Intermediate Position | Tele End |
|---|---|---|---|
| $d_4$ | 15.529 | 7.298 | 1.650 |
| $d_{12}$ | 4.857 | 11.061 | 20.065 |
| $d_{14}$ | 3.341 | 2.565 | 2.314 |
| f | 5.964 | 10.059 | 17.393 |
| F value | 2.80 | 3.64 | 5.01 |
| 2ω | 63.0° | 39.3° | 23.2° |
| L | 42.067 | 39.265 | 42.370 |

Figure 14:
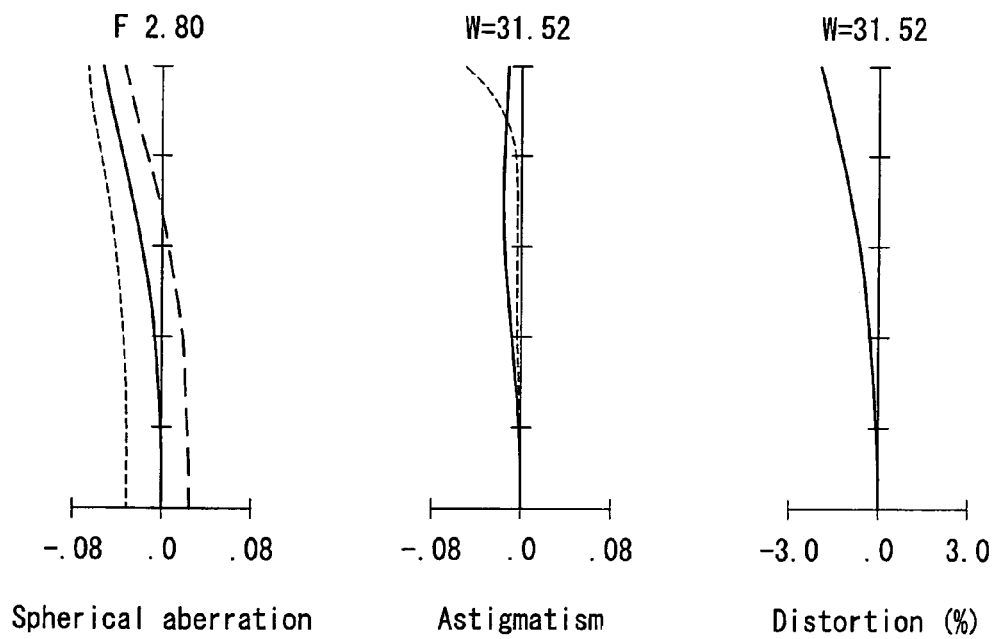
FIG. 14 shows aberration graphs for the wide-angle end of the zoom lens according to the fourth embodiment of the present invention.
Figure 15:
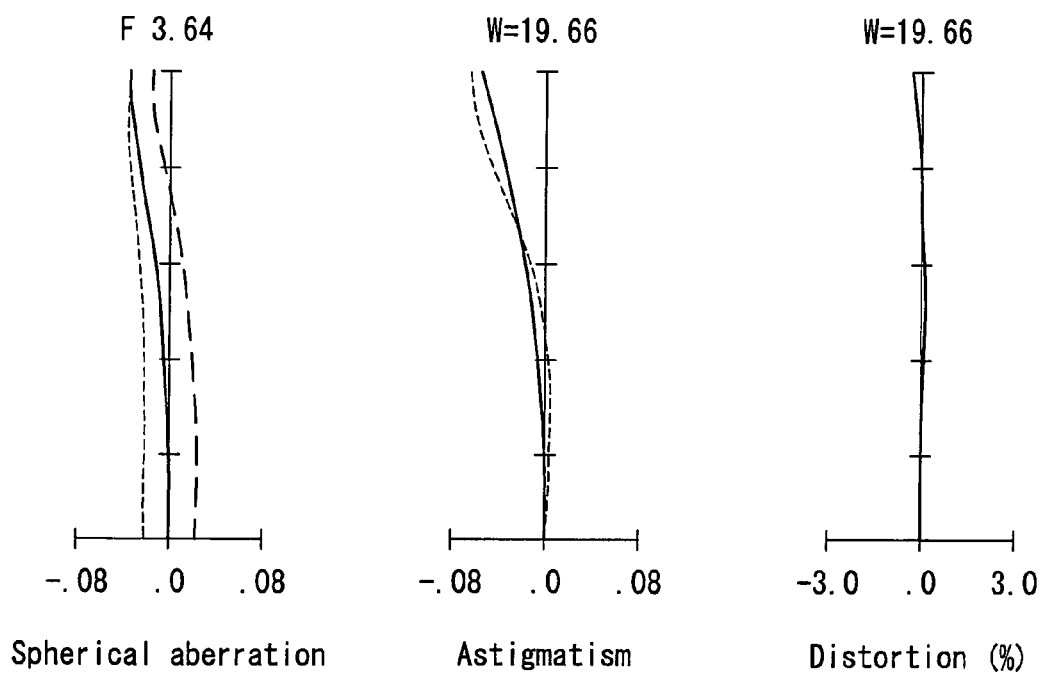
FIG. 15 shows aberration graphs for the intermediate position of the zoom lens according to the fourth embodiment of the present invention.
Figure 16:
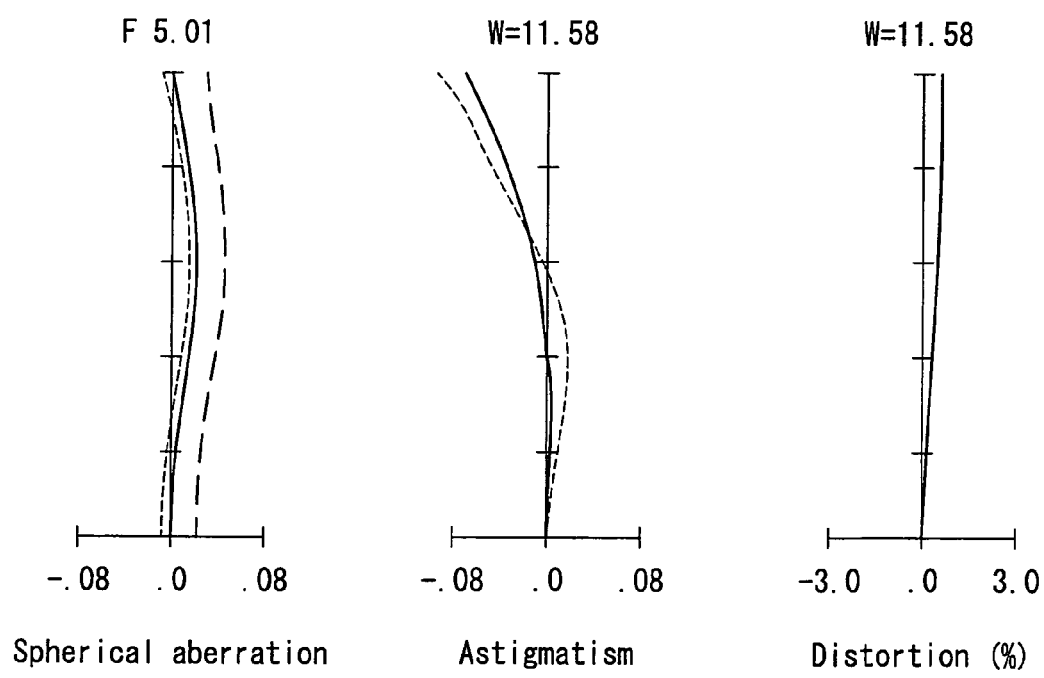
FIG. 16 shows aberration graphs for the tele end of the zoom lens according to the fourth embodiment of the present invention.

FIGS. 14, 15, and 16 are aberration graphs (spherical aberration, astigmatism, and distortion) of the zoom lens shown in FIG. 13 when the object distance is o and the aperture stop is fully open. FIG. 14 shows the case for the wide-angle end, FIG. 15 shows the case for the intermediate position, and FIG. 16 shows the case for the tele end.

It is clear from the aberration graphs shown in FIGS. 14 to 16 that the zoom lens of this embodiment demonstrates good aberration properties even if the zoom position is changed, and that the distortion at the maximum image height is small, being −2.0% at the wide-angle end and 0.7% at the tele end.

If the zoom lens shown in FIG. 13 is packaged in an electronic still camera, then the same solid-state imaging element described in the first embodiment can be used.

Since the image plane side surface of the third lens L3 is a concave surface, if necessary, the third lens L3 can be aligned easily during assembly as described in the first embodiment. Also, if the image-forming properties are not good at some regions on the imaging surface (image plane S) of the solid-state imaging element, then the solid-state imaging element can be tilted by 1° or less to improve the image-forming properties on the imaging surface (image plane S) of the solid-state imaging element.

As described above, the zoom lens shown in FIG. 13 has a zoom ratio of approximately ×2.9 at an object distance of ∞ and a field angle at the wide-angle end of approximately 63°, high resolution, a short optical total length when not in use, and low sensitivity to decentration, and the distortion is particularly good.

FIFTH EMBODIMENT

Figure 17:
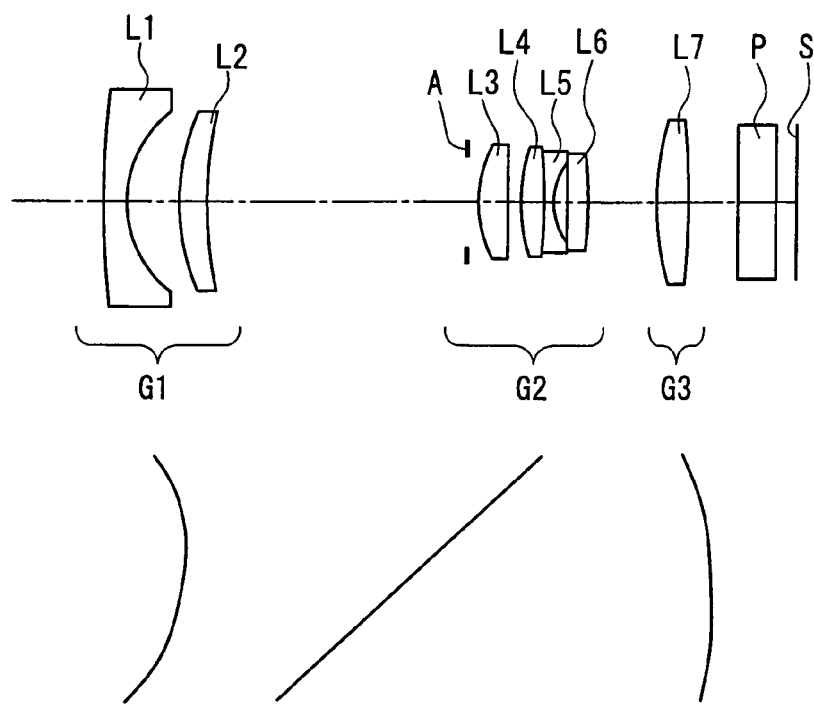
FIG. 17 is a layout drawing showing the configuration of a zoom lens according to a fifth embodiment of the present invention.

FIG. 17 is a layout drawing showing the configuration of a zoom lens according to a fifth embodiment of the present invention. This zoom lens is configured such that the resolution is high, the optical total length when collapsed is short, the sensitivity to decentration is low, and the distortion is good.

As shown in FIG. 17, the zoom lens of this embodiment is made of a first lens group G1 having a negative power, a second lens group G2 having a positive power, and a third lens group G3 having a positive power, arranged in that order from the object side (left side in FIG. 17) to the image plane S side (right side in FIG. 17), and includes seven lenses. An aperture stop A is fixed on the object side of the second lens group G2, and moves in the direction of the optical axis together with the second lens group G2.

The zoom lens shown in FIG. 17 has the same configuration as the zoom lens shown in the fourth embodiment, and is different only in the material of some of the lenses. That is, in the zoom lens of this embodiment, the fourth lens L4 is set to have a lower refractive index than in the zoom lens described above in the fourth embodiment.

In order to obtain better optical properties, the zoom lens of this embodiment is configured such that the conditional expressions (1) to (7), (8'), and (9) to (12) described above in the second embodiment, and moreover, the conditional expressions (13) and (14) described above in the fourth embodiment, are satisfied.

Table 13 below shows specific examples of the numerical values of the zoom lens shown in FIG. 17.

TABLE 13

| Group | Element | Surface | R | d | $n_d$ | $v_d$ |
|---|---|---|---|---|---|---|
| G1 | L1 | 1 | 70.907 | 1.500 | 1.75016 | 45.1 |
|  |  | 2 | 5.468* | 2.641 |  |  |
|  | L2 | 3 | 10.825 | 1.730 | 1.84666 | 23.8 |
|  |  | 4 | 25.518 | variable |  |  |

TABLE 13-continued

| Group | Element | Surface | R | d | $n_d$ | $v_d$ |
|---|---|---|---|---|---|---|
| G2 | Stop | 5 | ∞ | 0.900 | | |
| | L3 | 6 | 7.785* | 1.680 | 1.80431 | 40.9 |
| | | 7 | 59.620 | 0.954 | | |
| | L4 | 8 | 10.117 | 1.400 | 1.74330 | 49.2 |
| | L5 | 9 | −42.455 | 0.700 | 1.84666 | 23.8 |
| | | 10 | 5.432 | 0.657 | | |
| | L6 | 11 | 289.024 | 1.200 | 1.83400 | 37.3 |
| | | 12 | −18.851 | variable | | |
| G3 | L7 | 13 | 17.024* | 1.800 | 1.66556 | 54.8 |
| | | 14 | −68.356 | variable | | |
| | P | 15 | ∞ | 2.100 | 1.51680 | 64.2 |
| | | 16 | ∞ | | | |

Table 14 below shows the conic constant and the aspheric coefficients of the zoom lens shown in FIG. 17.

TABLE 14

| | Second Surface | Sixth Surface | Thirteenth Surface |
|---|---|---|---|
| κ | −0.790964 | −0.578879 | 0.687388 |
| D | $4.03996 \times 10^{-5}$ | $-1.77159 \times 10^{-5}$ | $-1.59235 \times 10^{-4}$ |
| E | $1.30976 \times 10^{-6}$ | $-1.75943 \times 10^{-6}$ | $1.33087 \times 10^{-5}$ |
| F | $-1.92836 \times 10^{-8}$ | $9.00055 \times 10^{-8}$ | $-6.82532 \times 10^{-7}$ |
| G | $-4.10437 \times 10^{-11}$ | $5.73446 \times 10^{-9}$ | $1.32812 \times 10^{-8}$ |

Also, Table 15 below shows the variable distance between surfaces (in mm) when the object distance of the zoom lens shown in FIG. 17 is ∞.

TABLE 15

| Surface Spacing | Wide-angle End | Intermediate Position | Tele End |
|---|---|---|---|
| $d_4$ | 15.494 | 7.298 | 1.650 |
| $d_{12}$ | 4.826 | 11.003 | 20.087 |
| $d_{14}$ | 3.386 | 2.623 | 2.292 |
| F | 5.962 | 10.027 | 17.338 |
| F value | 2.82 | 3.66 | 5.04 |
| 2ω | 63.0° | 39.4° | 23.2° |
| L | 42.058 | 39.276 | 42.382 |

Figure 18:
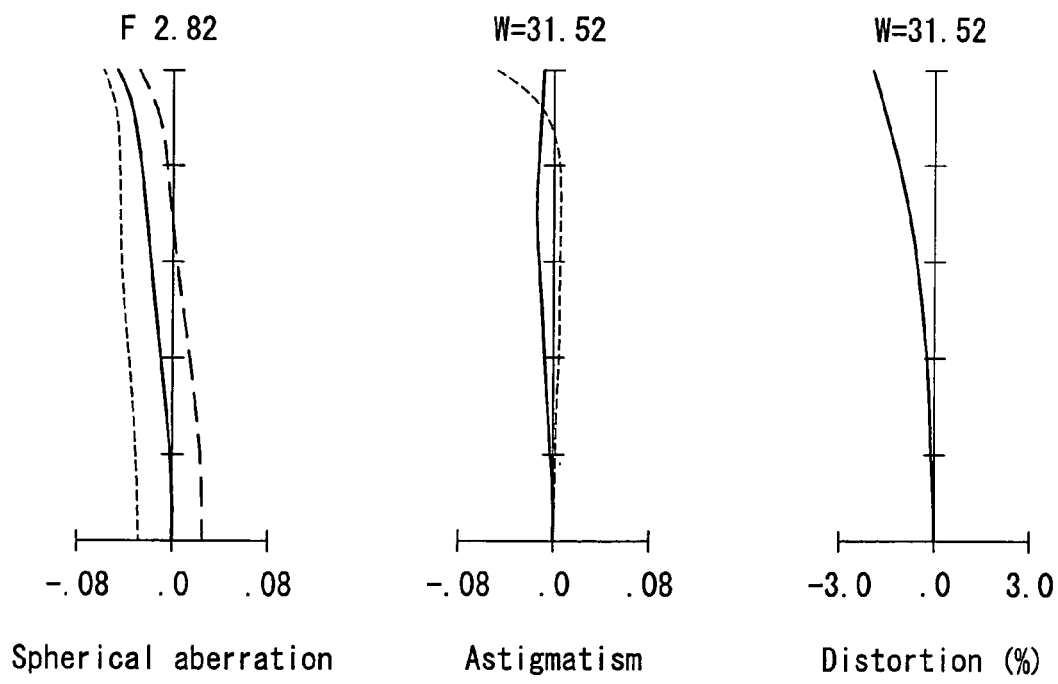
FIG. 18 shows aberration graphs for the wide-angle end of the zoom lens according to the fifth embodiment of the present invention.
Figure 19:
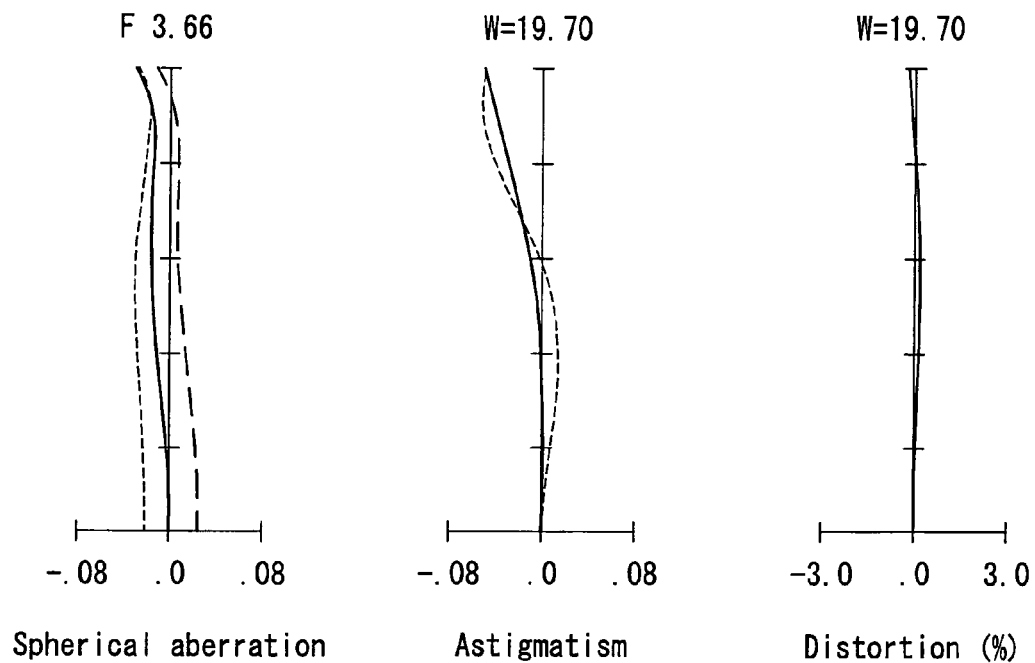
FIG. 19 shows aberration graphs for the intermediate position of the zoom lens according to the fifth embodiment of the present invention.
Figure 20:
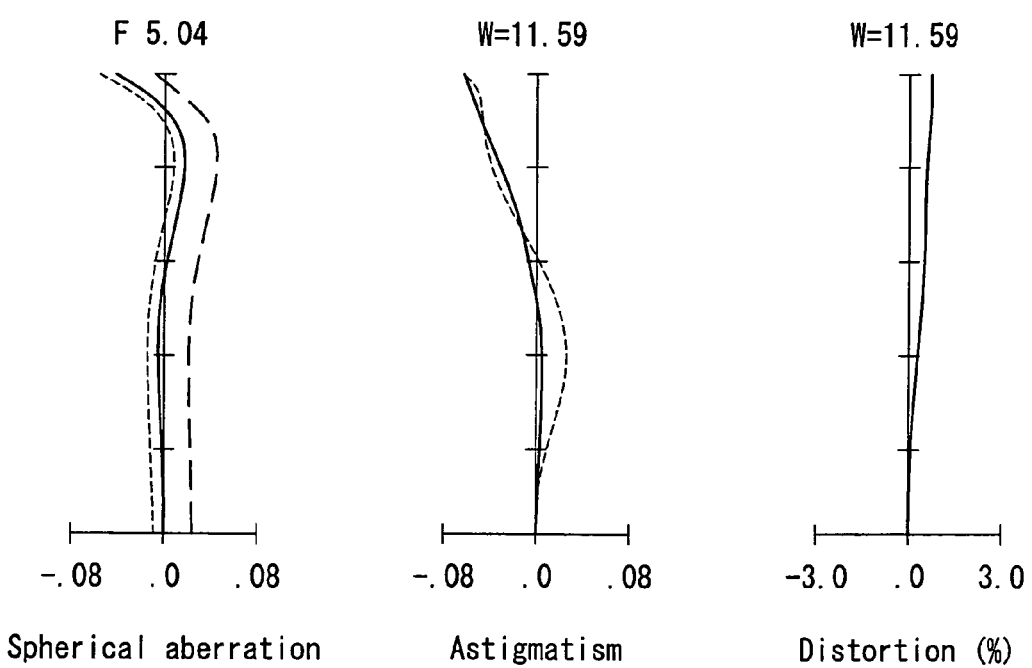
FIG. 20 shows aberration graphs for the tele end of the zoom lens according to the fifth embodiment of the present invention.
Figure 21A:
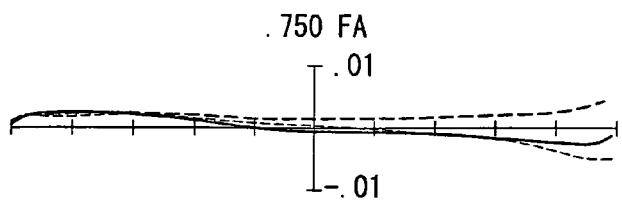
FIG. 21 shows aberration graphs for the standard state and aberration graphs for the camera shake corrected state at the tele end, when the aperture stop is open and the object distance is ∞, of the zoom lens according to the sixth embodiment of the present invention.
Figure 21B:
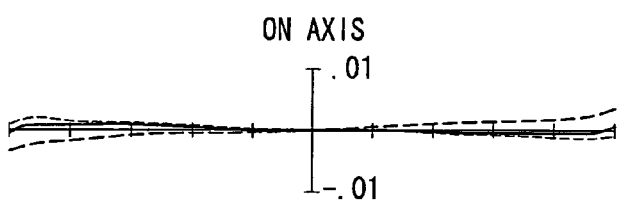
Figure 21C:
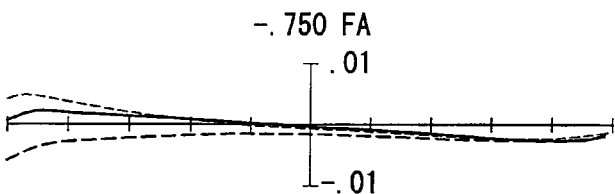
Figure 21D:
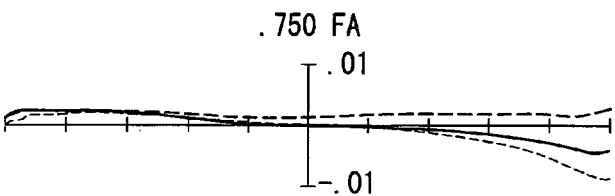
Figure 21E:
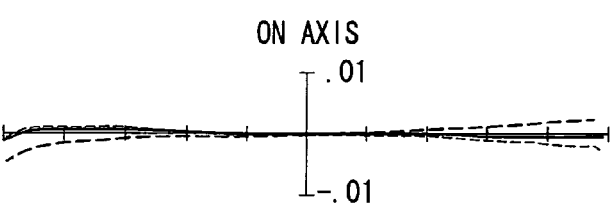
Figure 21F:
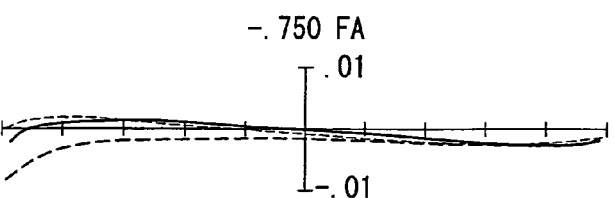
Figure 22A:
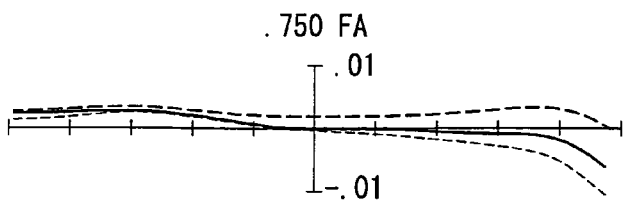
FIG. 22 shows aberration graphs for the standard state and aberration graphs for the camera shake corrected state at the tele end, when the aperture stop is open and the object distance is ∞, of the zoom lens according to the seventh embodiment of the present invention.
Figure 22B:
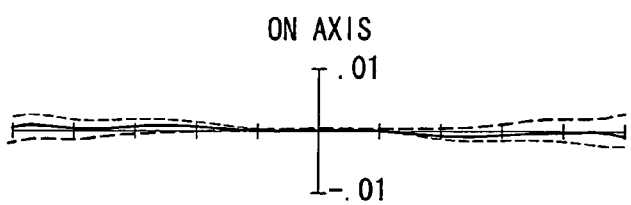
Figure 22C:
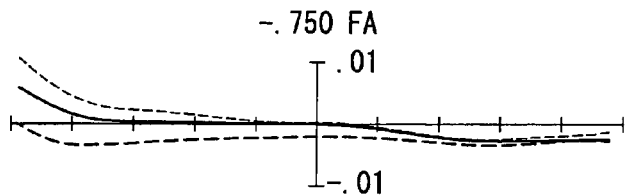
Figure 22D:
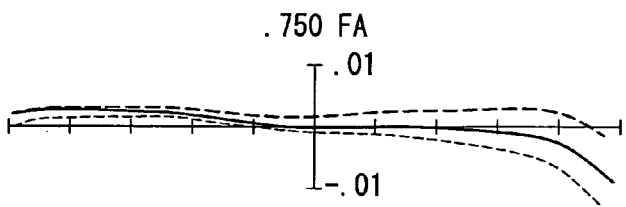
Figure 22E:
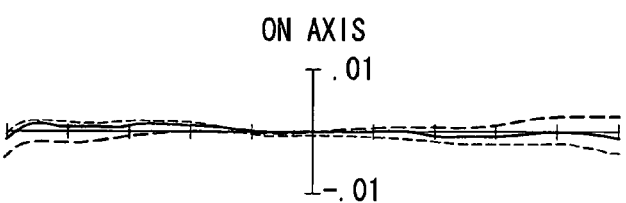
Figure 22F:
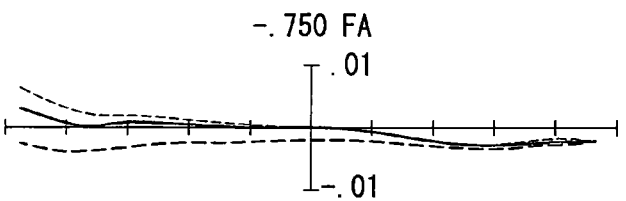
Figure 23A:
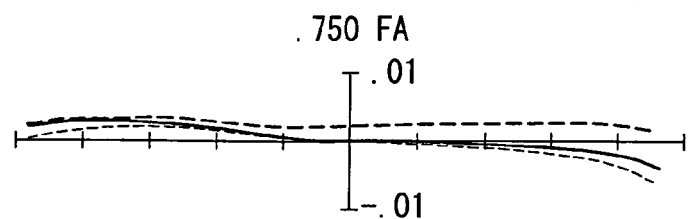
FIG. 23 shows aberration graphs for the standard state and aberration graphs for the camera shake corrected state at the tele end, when the aperture stop is open and the object distance is ∞, of the zoom lens according to the eighth embodiment of the present invention.
Figure 23B:
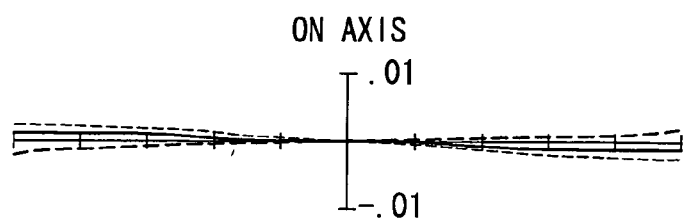
Figure 23C:
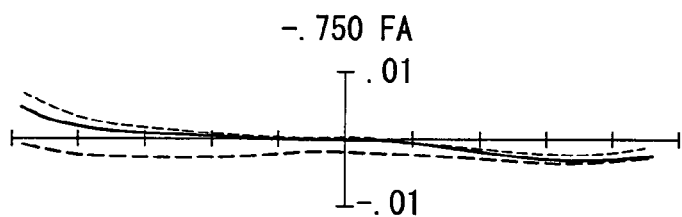
Figure 23D:
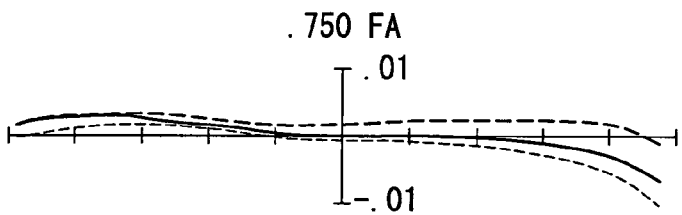
Figure 23E:
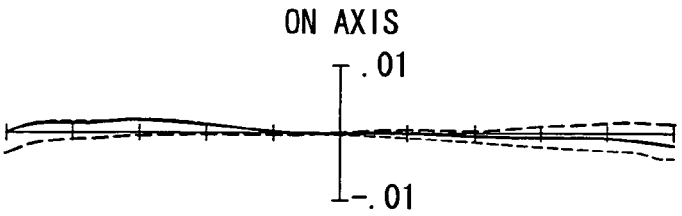
Figure 23F:
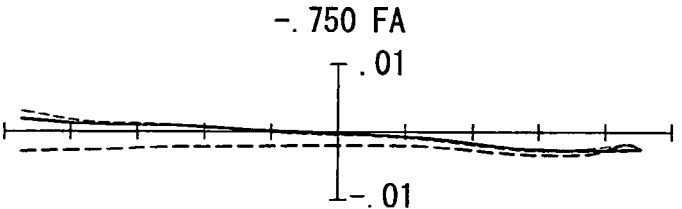
Figure 24A:
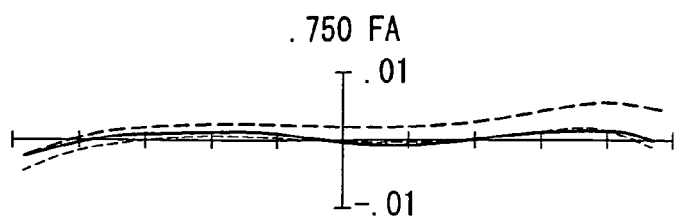
FIG. 24 shows aberration graphs for the standard state and aberration graphs for the camera shake corrected state at the tele end, when the aperture stop is open and the object distance is ∞, of the zoom lens according to the ninth embodiment of the present invention.
Figure 24B:
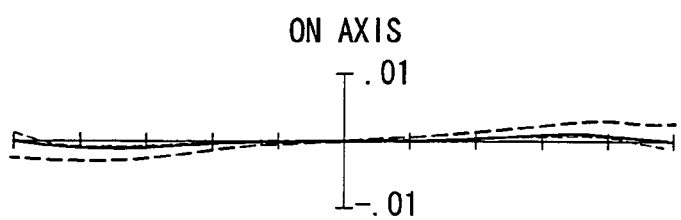
Figure 24C:
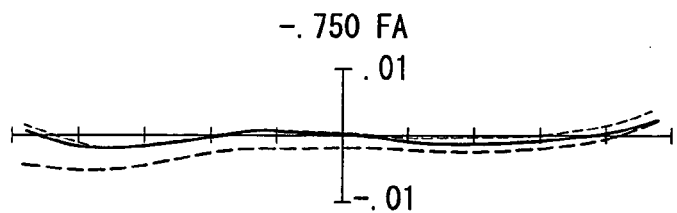
Figure 24D:
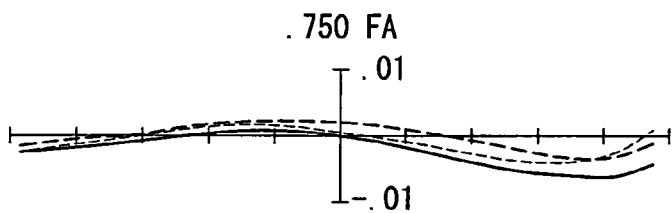
Figure 24E:
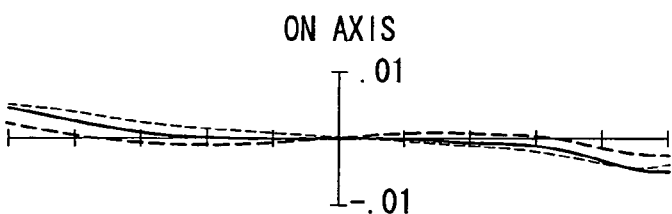
Figure 24F:
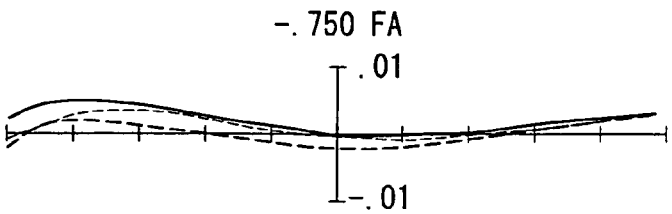
Figure 25A:
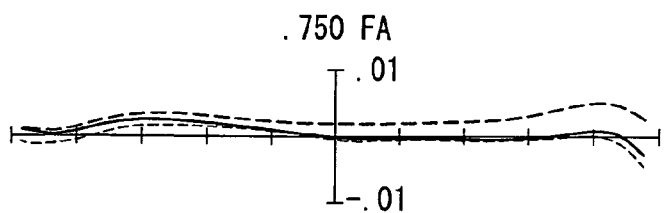
FIG. 25 shows aberration graphs for the standard state and aberration graphs for the camera shake corrected state at the tele end, when the aperture stop is open and the object distance is ∞, of the zoom lens according to the tenth embodiment of the present invention.
Figure 25B:
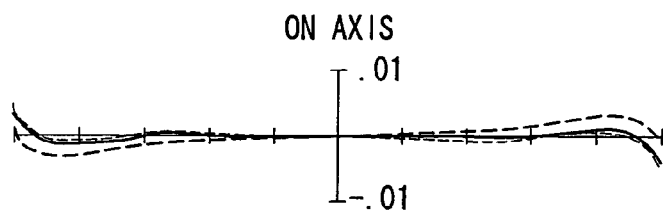
Figure 25C:
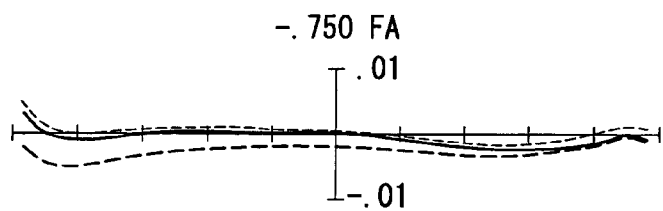
Figure 25D:
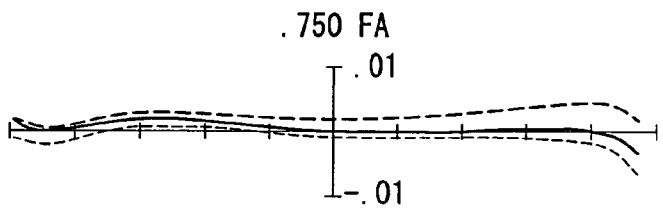
Figure 25E:
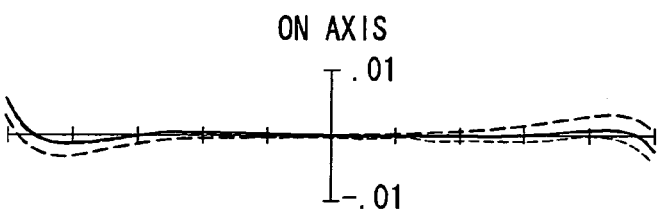
Figure 25F:
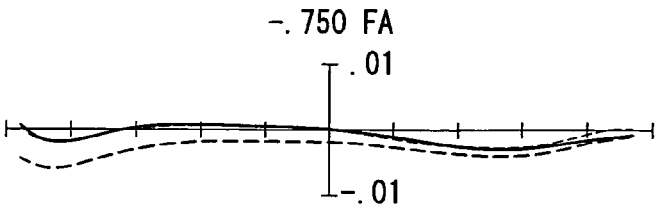

FIGS. 18, 19, and 20 are aberration graphs (spherical aberration, astigmatism, and distortion) of the zoom lens shown in FIG. 17 when the object distance is ∞ and the aperture stop is fully open. FIG. 18 shows the case for the wide-angle end, FIG. 19 shows the case for the intermediate position, and FIG. 20 shows the case for the tele end.

It is clear from the aberration graphs shown in FIGS. 18 to 20 that the zoom lens of this embodiment demonstrates good aberration properties even if the zoom position is changed, and that the distortion at the maximum image height is small, being −2.0% at the wide-angle end and 0.8% at the tele end.

If the zoom lens shown in FIG. 17 is packaged in an electronic still camera, then the same solid-state imaging element described in the first embodiment can be used.

Since the image plane side surface of the third lens L3 is a concave surface, if necessary, the third lens L3 can be aligned easily during assembly as described in the first embodiment. Also, if the image-forming properties are not good at some regions on the imaging surface (image plane S) of the solid-state imaging element, then the solid-state imaging element can be tilted by 1° or less to improve the image-forming properties on the imaging surface (image plane S) of the solid-state imaging element.

As described above, the zoom lens shown in FIG. 17 has a zoom ratio of approximately ×2.9 and a field angle at the wide-angle end of approximately 63°, high resolution, a short optical total length when not in use, and low sensitivity to decentration, and the distortion is particularly good. Table 16 below shows the numerical values of the conditional expressions detailed above for the first through fifth embodiments described above.

TABLE 16

| Conditional Expression | Embodiment | | | | |
|---|---|---|---|---|---|
| | 1 | 2 | 3 | 4 | 5 |
| $\|L_W - L_T\|/L_W$ | 0.000 | 0.000 | 0.000 | 0.007 | 0.008 |
| $f_{G2}/f_W$ | 2.113 | 2.124 | 2.223 | 2.172 | 2.180 |
| $f_{G3}/f_W$ | 3.506 | 3.473 | 3.716 | 3.511 | 3.464 |
| $f_3/f_{G2}$ | 0.680 | 0.759 | 0.789 | 0.908 | 0.844 |
| $f_6/f_{G2}$ | 1.631 | 1.614 | 1.663 | 1.661 | 1.635 |
| $n_3$ | 1.80431 | 1.80431 | 1.80431 | 1.80431 | 1.80431 |
| $v_3$ | 40.9 | 40.9 | 40.9 | 40.9 | 40.9 |
| $n_4$ | 1.62299 | 1.74330 | 1.77250 | 1.77250 | 1.74330 |
| $v_4$ | 58.1 | 49.2 | 49.6 | 49.6 | 49.2 |
| $n_6$ | 1.80611 | 1.83400 | 1.83400 | 1.83400 | 1.83400 |
| $v_6$ | 40.7 | 37.3 | 37.3 | 37.3 | 37.3 |
| $r_{1F}/f_W$ | 37.907 | 38.836 | 35.495 | 10.251 | 11.893 |
| $r_{2R}/f_W$ | 5.332 | 5.243 | 5.145 | 4.116 | 4.280 |
| $\kappa_{3F} + 8D_{3F}r_{3F}^3$ | −0.615 | −0.633 | −0.700 | −0.639 | −0.646 |

It should be noted that in the first through fifth embodiments, the zoom lenses therein were each described as having a resolution compatible with a solid-state imaging element having approximately 3 million pixels, but if the processing error of the lens elements and the lens barrel components is reduced and the assembly error is reduced, then the zoom lenses can be given a resolution that is compatible with a solid-state imaging element having a recording pixel number of approximately 4 million pixels at substantially the same recording picture size. The specific dimensions of a solid-state imaging element having approximately four million pixels are a recording pixel number of 2304 (horizontal)×1728 (vertical) (approximately 4 million pixels), a pixel pitch of 2.5 µm (horizontal)×2.5 µm (vertical), and a recording picture size of 5.76 mm (horizontal)× 4.32 mm (vertical) (7.2 mm diagonal).

SIXTH EMBODIMENT

The zoom lens of this embodiment is the zoom lens according to the first embodiment, configured so that the air distance between the aperture stop A and the second lens group G2 is kept constant and only the second lens group G2 can be parallel displaced in the direction perpendicular to the optical axis. Consequently, the lens data, the aspheric data, and the variable air spacing data when the object distance is ∞ are identical to those shown above in Table 1, Table 2, and Table 3.

As in the first embodiment, focus adjustment is performed by moving the third lens group G3 in the direction of the optical axis.

In the zoom lens of this embodiment, if the camera is shaken while capturing an image, then by parallel displacing the second lens group G2 in the direction perpendicular to the optical axis by a suitable amount it is possible to keep the captured image that is formed on the solid-state imaging element from moving without there being a significant drop in the image-forming properties during camera shake correction. Here, "standard state" is used to refer to a case where the amount that the second lens group G2 is displaced is 0, and "camera shake corrected state" is used to refer to a case where the second lens group G2 has been parallel displaced.

The zoom lens of this embodiment is configured so that it satisfies the Conditional Expression (2) described above in the first embodiment as well as satisfies the following conditional expression.

$$1.7 < (1 - m_{G2T})m_{G3T} < 2.1 \quad (15)$$

Here, $m_{G2T}$ and $m_{G3T}$ are the magnifications of the second lens group G2 and the third lens group G3, respectively, at the tele end when the object distance is $\infty$.

It should be noted that the zoom lens of this embodiment is desirably configured to satisfy the Conditional Expressions (1) and (3) to (12) described above in the first embodiment so that even better optical performance is achieved.

Also, in order to obtain even better image-forming properties, it is desirable that the zoom lens of this embodiment satisfies the following conditional expression instead of the above Conditional Expression (12).

$$-0.75 < \kappa_{3F} + 8D_{3F}r_{3F}^3 < -0.5. \quad (12')$$

Also, in order to obtain even better image-forming properties, it is desirable that the zoom lens of this embodiment satisfies the following conditional expression in place of the above Conditional Expression (15).

$$1.8 < (1 - m_{G2T})m_{G3T} < 2.0 \quad (15')$$

The fundamental idea behind the method of camera shake correction of the present invention is described below.

The inventors of the present application independently evaluated decentering third-order aberration as well as performed various additional tests, and found that parallel displacing the second lens group G2 in the direction that is perpendicular to the optical axis is effective as a method for correcting camera shake in a zoom lens made of three groups having negative, positive, and positive power arranged in that order from the object side.

When the object distance is $\infty$, the angle of tilt of the zoom lens due to camera shake is $\theta$, and the combined focal length of the entire lens system is f, then the amount of image shift $e_M$ near the center of the picture if the object distance is $\infty$, is expressed as:

$$e_M = f \tan \theta. \quad (16)$$

It can be understood from the above expression (16) that assuming a same angle of tilt of the zoom lens, the amount of image shift is greater the longer the combined focal length of the overall lens system. This means that the longer the focal length of the zoom lens, the more likely blurring due to camera shake is to occur.

When the magnification of the second lens group G2 is regarded as $m_{G2}$ and the magnification of the third lens group G3 is regarded as $m_{G3}$, then the amount of image shift em when the second lens group G2 is parallel displaced by the amount $e_{G2}$ perpendicular to the optical axis is expressed by:

$$e_M = (1 - m_{G2})m_{G3}e_{G2}. \quad (17)$$

Here, particular note should be made of the fact that in the overall zoom range, $m_{G2}$ is negative and $m_{G3}$ is positive.

In the zoom lens shown in the first embodiment, $|m_{G2}|$ monotonically increases and $m_{G3}$ hardly changes when zooming from the wide-angle end to the tele end, and thus $(1-m_{G2})m_{G3}$ also monotonically increases.

Since both $m_{G2}$ and $m_{G3}$ can be expressed as functions of the combined focal length f of the entire lens system, if the zoom lens is tilted due to camera shake, then as long as the combined focal length f of the entire lens system and the angle of tilt $\theta$ of the zoom lens are known it is possible to find the appropriate amount $e_{G2}$ with which to parallel displace the second lens group G2 from the above expressions (16) and (17), and by parallel displacing the second lens group G2 by that amount, the problem of blurring due to camera shake can be solved.

However, it is widely known that when some of the lenses of a lens system are made decentered, the image-forming properties of the entire picture or some of the picture are worse. With the method of camera shake correction of the present invention, there is the possibility that since the lens is decentered, the image-forming properties in the camera shake corrected state may not be as good as the image-forming properties in the standard state. In this case, in the camera shake corrected state there is greater a tendency for some of the image-forming properties of the captured image to become poor (partial blurring) or for the image-forming properties of the entire captured image to drop compared to the standard state.

Thus, to improve the image-forming properties in the standard state it is obviously necessary to reduce the amount of change of aberration between the standard state and the camera shake corrected state in order to prevent the image-forming properties from deteriorating when correcting camera shake.

The inventors of the present application found that in order to improve the image-forming properties in the camera shake corrected state, the light beam that passes through the center portion of the aperture stop and the light beam that passes through the peripheral portion of the aperture stop can be thought of as distinct. Accordingly, in this embodiment, the image-forming properties in the camera shake corrected state are kept from deteriorating by reducing the amount that the second lens group G2 is parallel displaced with respect to the light beam that passes through peripheral portion of the aperture stop A, and by reducing the decentering third-order aberration that occurs at the second lens group G2 with respect to the light beam that passes through the center portion of the aperture stop A.

Of the lens surfaces of the lenses making up the second lens group G2, the object side surface of the third lens L3 and the image plane side surface of the fifth lens L5 have large decentering coma and decentering astigmatism. The object side surface of the third lens L3 and the image plane side surface of the fifth lens L5 govern the power distribution and the image-forming properties in the standard state, and therefore large changes cannot be made to their parameters. However, the parameters of the aspherical surface of the third lens L3 can be altered to a certain extent. Accordingly, in this embodiment, the parameters of the aspherical surface on the object side of the third lens L3 are appropriately chosen so that the decentering coma and the decentering astigmatism of the second lens group G2 become small.

It is clear from expression (17) that the amount that the second lens group G2 is parallel displaced can be reduced by increasing $(1-m_{G2})m_{G3}$. However, when $(1-m_{G2})m_{G3}$ becomes too large it is difficult to stabilize the image at a fixed position during camera shake correction. Accordingly, in this embodiment, the amount that the second lens group G2 is parallel displaced is set within a suitable range.

The above Conditional Expressions (12) and (12') are for reducing the drop in the image-forming properties when correcting camera shake by regulating the conic constant and the fourth-order aspheric coefficient of the aspherical surface of the third lens L3 with respect to the light beam having a small field angle that passes through the center portion of the aperture stop A. The Conditional Expression (12), as described above in the first embodiment, is a condition for reducing the sensitivity to decentration of the object side surface of the third lens L3. $\kappa_{3F}+8D_{3F}r_{3F}^3$ expresses the extent of deviation of the aspherical surface from a spherical surface. When $\kappa_{3F}+8D_{3F}r_{3F}^3$ is $-0.8$ or less, the effects of the aspherical surface reduce the spherical aberration that is generated by the object side surface of the third lens L3, but the decentering coma and the decentering astigmatism that are generated by the object side surface of the third lens L3 when correcting camera shake become too great. On the other hand, when $\kappa_{3F}+8D_{3F}r_{3F}^3$ is $-0.5$ or more, the decentering coma and the decentering astigmatism that are generated by the object side surface of the third lens L3 become small, but the spherical aberration is not sufficiently corrected or the radius of curvature of the image-plane side surface of the fifth lens L5 becomes short, and thus the decentering coma and the decentering astigmatism that are generated by the image-plane side surface of the fifth lens L5 become large, making it difficult to reduce the decentering coma and the decentering astigmatism of the entire second lens group G2.

Conditional Expressions (15) and (15') are for improving the image-forming properties during camera shake correction. When $(1-m_{G2T})m_{G3T}$ is 1.7 or less, the amount of displacement of the second lens group G2 that is required to make the image shift by a predetermined amount becomes too large, and this increases the amount of change of the aberration due to parallel displacing the second lens group G2, worsening the image-forming properties at the peripheral portions of the image. On the other hand, when $(1-m_{G2T})m_{G3T}$ is 2.1 or more, the amount of displacement of the second lens group G2 that is required to make the image shift by a predetermined amount becomes too small, making it difficult to parallel displace the second lens group G2 with precision. As a result, pixel difference when capturing an image cannot be reduced sufficiently, and thus it becomes difficult to provide good image-forming properties during camera shake correction.

The image-forming properties in the standard state of the zoom lens in this embodiment are exactly the same as the image-forming properties in the first embodiment, and as is clear from the aberration graphs shown in FIG. 2 to FIG. 4, the zoom lens of this embodiment demonstrates favorable aberration properties even when the zoom position is changed.

FIG. 21 shows the aberration graphs for the standard state and the aberration graphs for the camera shake corrected state at the tele end, when the aperture stop is fully open and the object distance is $\infty$, of the zoom lens of this embodiment. In the camera shake corrected state, the entire second lens group G2 has been parallel displaced by 0.078 mm in the direction perpendicular to the optical axis. FIG. 21A, FIG. 21B, and FIG. 21C show the lateral aberration at an image point that is 75% of the maximum image height (+75% image point), an image point on the axis, and an image point that is −75% of the maximum image height (−75% image point) in the standard state, respectively. FIG. 21D, FIG. 21E, and FIG. 21F show the lateral aberration at the +75% image point, the image point on the axis, and the −75% image point in the camera shake corrected state, respectively. In the diagrams, the solid line indicates characteristics at the d-line, the short dashed line indicates characteristics at the F-line, and the long dashed line indicates characteristics at the C-line. It should be noted that in FIG. 21, the meridional plane is the plane that includes the optical axis of the first lens group G1 and the optical axis of the second lens group G2.

The amount of image shift at the tele end with an object distance of $\infty$ in a case where the zoom lens is tilted by 0.5° is equivalent to the amount of image shift when the entire second lens group G2 is parallel displaced by 0.078 mm in the direction perpendicular to the optical axis.

It is clear from the aberration graphs of FIG. 21 that there is good symmetry of the lateral aberration at the image point on the axis. Comparing the lateral aberration at the +75% image point and the lateral aberration at the −75% image point, from the fact that they both have a small degree of curvature and the slopes of their aberration curves are substantially equal, it is clear that there is little decentering coma and decentering astigmatism. This means that sufficient image-forming properties can be obtained even when the camera shake has been corrected. Also, if the camera shake angle of the zoom lens remains the same, then the amount of parallel displacement of the second lens group G2 that is required for camera shake correction is reduced as the combined focal length of the overall lens system becomes shorter. Consequently, regardless of the zoom position, sufficient camera shake correction is possible for camera shake angles up to 0.5° without lowering the image-forming properties.

When correcting camera shake, it is necessary to keep the air space in the direction of the optical axis between the aperture stop A and the second lens group G2 constant while parallel displacing the second lens group G2 in the direction perpendicular to the optical axis without parallel displacing the aperture stop A in the direction perpendicular to the optical axis. In this case, when the aperture stop A and the second lens group G2 become too close, it becomes difficult to parallel displace the second lens group G2 in the direction perpendicular to the optical axis due to structural restrictions of the lens barrel component. On the other hand, when the aperture stop A and the second lens group G2 are too far apart, the optical total length when collapsed becomes long. Accordingly, in the zoom lens of this embodiment, the air distance between the aperture stop A and the third lens L3 is set to 0.9 mm.

In the zoom lens of this embodiment, the lens group that is moved in the direction of the optical axis for focus adjustment and the lens group that is moved in the direction perpendicular to the optical axis for camera shake correction are different, which allows the structure of the lens barrel to be kept from becoming too complex. In the case of a configuration in which one lens group is moved in the direction of the optical axis and also the direction perpendicular to the optical axis, it is necessary to use a powerful motor or actuator in order for one of a motor for focus adjustment and an actuator for camera shake correction to move the other. As a result, the lens barrel becomes large, making it impossible to achieve the compact electronic still camera intended by the present invention.

As described above, the zoom lens of this embodiment has a zoom ratio of approximately ×3.0 when the object distance is $\infty$, a field angle at the wide-angle end of approximately 66°, and moreover has high resolution and a short optical total length when not in use, is provided with a camera shake correction function, and has good image-forming properties during camera shake correction.

If the zoom lens of this embodiment is packaged in an electronic still camera, then as the solid-state imaging element it is possible to use a solid-state imaging element having a recording pixel number of 2048 (horizontal)×1536 (vertical) (approximately three million pixels), a pixel pitch of 2.8 µm (horizontal)×2.8 µm (vertical), and a recording picture size of 5.7344 mm (horizontal)×4.3008 mm (vertical). It is also possible to use a solid-state imaging element that has been provided with a miniature positive lens for each pixel in order to increase the effective aperture ratio.

Blurring due to camera shake becomes more noticeable the longer the focal length and the slower the shutter speed. Also, a zoom lens made of three groups having negative, positive, and positive power arranged in that order from the object side typically has the characteristic that the F-number at full aperture of the tele end is darker than the F-number at full aperture of the wide-angle end. If such a zoom lens made of three groups is packaged in an electronic still camera, then, assuming the same brightness of the object, it is necessary to make the shutter speed at the tele end slower than the shutter speed at the wide-angle end in order to achieve sufficient exposure. Consequently, with a zoom lens made of three groups, blurring due to camera shake at the tele end is more conspicuous than at the wide-angle end. Regarding this problem, the zoom lens of this embodiment has been provided with a camera shake correction function so that a captured image without blurring due to camera shake or partial blurring can be obtained even if the shutter speed is slow.

Also, in the zoom lens of this embodiment, the lens data, the aspheric data, and the variable air spacing data when the object distance is ∞ are the same as those of the zoom lens according to the first embodiment described above, which does not have a camera shake correction function. This means that the majority of the seven lenses and the lens barrel components can be used in common to achieve both a zoom lens that does not have a camera shake correction function and a zoom lens that does have a camera shake correction function, thus allowing costs to be reduced in the mass production of the zoom lenses.

SEVENTH EMBODIMENT

The zoom lens of this embodiment is the zoom lens according to the second embodiment, configured so that the air space between the aperture stop A and the second lens group G2 is kept constant and only the second lens group G2 can be parallel displaced in the direction perpendicular to the optical axis. Consequently, the lens data, the aspheric data, and the variable air spacing data when the object distance is ∞ are exactly the same as those shown above in Table 4, Table 5, and Table 6.

As in the second embodiment, focus adjustment is performed by moving the third lens group G3 in the direction of the optical axis.

In the zoom lens of this embodiment, the second lens group G2 is parallel displaced in the direction perpendicular to the optical axis so that camera shake can be corrected and so that the image-forming properties when correcting camera shake are also good.

The zoom lens of this embodiment satisfies the Conditional Expression (2) described above in the second embodiment, and also satisfies the Conditional Expression (15) or the Conditional Expression (15') described above in the sixth embodiment.

It should be noted that in order to obtain even better optical performance, the zoom lens of this embodiment desirably is configured so that it satisfies the Conditional Expressions (1), (3) to (7), (8'), and (9) to (12) described above in the second embodiment or the Conditional Expression (12') described above in the sixth embodiment in place of Conditional Expression (12). The image-forming properties in the standard state of the zoom lens in this embodiment are exactly the same as the image-forming properties in the second embodiment, and as is clear from the aberration graphs shown in FIG. 6 to FIG. 8, the zoom lens of this embodiment demonstrates good aberration even when the zoom position is changed.

FIG. 22 shows the aberration graphs for the standard state and the aberration graphs for the camera shake corrected state of the zoom lens of this embodiment at the tele end when the aperture stop is fully open and the object distance is ∞. In the camera shake corrected state, the entire second lens group G2 has been parallel displaced by 0.080 mm in the direction perpendicular to the optical axis. FIG. 22A, FIG. 22B, and FIG. 22C show the lateral aberration at an image point that is 75% of the maximum image height (+75% image point), an image point on the axis, and an image point that is −75% of the maximum image height (−75% image point) in the standard state, respectively. FIG. 22D, FIG. 22E, and FIG. 22F show the lateral aberration at +75% image point, an image point on the axis, and −75% image point in the camera shake corrected state, respectively. In the diagrams, the solid line indicates characteristics at the d-line, the short dashed line indicates characteristics at the F-line, and the long dashed line indicates characteristics at the C-line. It should be noted that in FIG. 22, the meridional plane is the plane that includes the optical axis of the first lens group G1 and the optical axis of the second lens group G2.

The amount of image shift at the tele end with an object distance of ∞ in a case where the zoom lens is tilted 0.5° is equivalent to the amount of image shift when the entire second lens group G2 is parallel displaced by 0.080 mm in the direction perpendicular to the optical axis.

It is clear from the aberration graphs shown in FIG. 22 that in the zoom lens of this embodiment, like in the case of the sixth embodiment, sufficient camera shake correction can be achieved with respect to camera shake angles up to 0.5° without lowering the image-forming properties. Also, like in the sixth embodiment, in the zoom lens of this embodiment the air space between the aperture stop A and the third lens L3 is set to 0.9 mm, adequate space for providing the camera shake correction function is ensured, and the optical total length when collapsed can be shortened.

If the zoom lens of this embodiment is packaged in an electronic still camera, then the solid-state imaging element described in the sixth embodiment can be used.

As described above, the zoom lens of this embodiment has a zoom ratio of approximately ×3.0 when the object distance is ∞, a field angle at the wide-angle end of approximately 66°, high resolution, and moreover has a short optical total length when not in use and low sensitivity to decentration, and furthermore is provided with a camera shake correction function and has good image-forming properties during camera shake correction.

EIGHTH EMBODIMENT

The zoom lens of this embodiment is the zoom lens according to the third embodiment, configured so that the air space between the aperture stop A and the second lens group G2 is kept constant and only the second lens group G2 can be parallel displaced in the direction perpendicular to the optical axis. Consequently, the lens data, the aspheric data, and the variable air spacing data when the object distance is ∞ are exactly the same as those shown above in Table 7, Table 8, and Table 9.

As in the third embodiment, focus adjustment is performed by moving the third lens group G3 in the direction of the optical axis.

In the zoom lens of this embodiment, the second lens group G2 is parallel displaced in the direction perpendicular to the optical axis so that camera shake can be corrected and so that the image-forming properties when correcting camera shake are also good.

The zoom lens of this embodiment satisfies the Conditional Expression (2) described above in the second embodiment, and also satisfies the Conditional Expression (15) or the Conditional Expression (15') described above in the sixth embodiment.

It should be noted that in order to obtain even better optical performance, the zoom lens of this embodiment desirably is configured so that it satisfies the Conditional Expressions (1), (3) to (7), (8'), and (9) to (12) described above in the second embodiment or the Conditional Expression (12') described above in the sixth embodiment in place of Conditional Expression (12).

The image-forming properties in the standard state of the zoom lens in this embodiment are exactly the same as the image-forming properties in the third embodiment, and as is clear from the aberration graphs shown in FIG. 10 to FIG. 12, the zoom lens of this embodiment demonstrates good aberration even when the zoom position is changed.

FIG. 23 shows the aberration graphs for the standard state and the aberration graphs for the camera shake corrected state of the zoom lens of this embodiment at the tele end when the aperture stop is fully open and the object distance is ∞. In the camera shake corrected state, the entire second lens group G2 has been parallel displaced by 0.079 mm in the direction perpendicular to the optical axis. FIG. 23A, FIG. 23B, and FIG. 23C show the lateral aberration at an image point that is 75% of the maximum image height (+75% image point), an image point on the axis, and an image point that is −75% of the maximum image height (−75% image point) in the standard state, respectively. FIG. 23D, FIG. 23E, and FIG. 23F show the lateral aberration at +75% image point, an image point on the axis, and −75% image point in the camera shake corrected state, respectively. In the diagrams, the solid line indicates characteristics at the d-line, the short dashed line indicates characteristics at the F-line, and the long dashed line indicates characteristics at the C-line. It should be noted that in FIG. 23, the meridional plane is the plane that includes the optical axis of the first lens group G1 and the optical axis of the second lens group G2.

The amount of image shift at the tele end with an object distance of ∞ in a case where the zoom lens is tilted 0.5° is equivalent to the amount of image shift when the entire second lens group G2 is parallel displaced by 0.079 mm in the direction perpendicular to the optical axis.

It is clear from the aberration graphs shown in FIG. 23 that in the zoom lens of this embodiment, like in the case of the sixth embodiment, sufficient camera shake correction can be achieved with respect to camera shake angles up to 0.5° without lowering the image-forming properties. Also, like in the sixth embodiment, in the zoom lens of this embodiment the air space between the aperture stop A and the third lens L3 is set to 0.9 mm, adequate space for providing the camera shake correction function is ensured, and the optical total length when collapsed can be shortened.

If the zoom lens of this embodiment is packaged in an electronic still camera, then the solid-state imaging element described above in the sixth embodiment can be used.

As described above, the zoom lens of this embodiment has a zoom ratio of approximately ×3.0 when the object distance is ∞, a field angle at the wide-angle end of approximately 66°, high resolution, and moreover has a short optical total length when not in use and low sensitivity to decentration, and furthermore is provided with a camera shake correction function and has good image-forming properties during camera shake correction.

NINTH EMBODIMENT

The zoom lens of this embodiment is the zoom lens according to the fourth embodiment, configured so that the air space between the aperture stop A and the second lens group G2 is kept constant and only the second lens group G2 can be parallel displaced in the direction perpendicular to the optical axis. Consequently, the lens data, the aspheric data, and the variable air spacing data when the object distance is ∞ are exactly the same as those shown above in Table 10, Table 11, and Table 12.

As in the fourth embodiment, focus adjustment is performed by moving the third lens group G3 in the direction of the optical axis.

In the zoom lens of this embodiment, the second lens group G2 is parallel displaced in the direction perpendicular to the optical axis so that camera shake can be corrected and so that the image-forming properties when correcting camera shake are also good.

The zoom lens of this embodiment satisfies the Conditional Expression (2) described above in the second embodiment, and also satisfies the Conditional Expression (15) or the Conditional Expression (15') described above in the sixth embodiment.

It should be noted that in order to obtain even better optical performance, the zoom lens of this embodiment desirably is configured so that it satisfies the Conditional Expressions (1), (3) to (7), (8'), and (9) to (12) described above in the second embodiment or the Conditional Expression (12') described above in the sixth embodiment in place of Conditional Expression (12), as well as the Conditional Expressions (13) and (14) described above in the fourth embodiment.

The image-forming properties of the standard state of the zoom lens in this embodiment are exactly the same as the image-forming properties in the fourth embodiment, and as is clear from the aberration graphs shown in FIG. 14 to FIG. 16, the zoom lens of this embodiment demonstrates good aberration even if the zoom position is changed.

FIG. 24 shows the aberration graphs for the standard state and the aberration graphs for the camera shake corrected state of the zoom lens of this embodiment at the tele end when the aperture stop is fully open and the object distance is ∞. In the camera shake corrected state, the entire second lens group G2 has been parallel displaced by 0.081 mm in the direction perpendicular to the optical axis. FIG. 24A, FIG. 24B, and FIG. 24C show the lateral aberration at an image point that is 75% of the maximum image height (+75% image point), an image point on the axis, and an image point that is −75% of the maximum image height (−75% image point) in the standard state, respectively. FIG. 24D, FIG. 24E, and FIG. 24F show the lateral aberration at +75% image point, an image point on the axis, and −75% image point in the camera shake corrected state, respectively. In the diagrams, the solid line indicates characteristics at the d-line, the short dashed line indicates characteristics at the F-line, and the long dashed line indicates characteristics at the C-line. It should be noted that in FIG. 24, the meridional plane is the plane that includes the optical axis of the first lens group G1 and the optical axis of the second lens group G2.

The amount of image shift at the tele end with an object distance of ∞ n a case where the zoom lens is tilted 0.5° is equivalent to the amount of image shift when the entire second lens group G2 is parallel displaced by 0.081 mm in the direction perpendicular to the optical axis.

It is clear from the aberration graphs shown in FIG. 24 that in the zoom lens of this embodiment, like in the case of the sixth embodiment, sufficient camera shake correction can be achieved with respect to camera shake angles up to 0.5° without lowering the image-forming properties. Also, like in the sixth embodiment, in the zoom lens of this embodiment the air space between the aperture stop A and the third lens L3 is set to 0.9 mm, adequate space for providing the camera shake correction function is ensured, and the optical total length when collapsed can be shortened.

If the zoom lens of this embodiment is packaged in an electronic still camera, then the solid-state imaging element described above in the sixth embodiment can be used.

As described above, the zoom lens of this embodiment has a zoom ratio of approximately ×2.9 when the object distance is ∞, a field angle at the wide-angle end of approximately 63°, high resolution, a short optical total length when not in use and low sensitivity to decentration, has particularly good distortion, and furthermore is provided with a camera shake correction function and has good image-forming properties during camera shake correction.

TENTH EMBODIMENT

The zoom lens of this embodiment is the zoom lens according to the fifth embodiment, configured so that the air space between the aperture stop A and the second lens group G2 is kept constant and only the second lens group G2 can be parallel displaced in the direction perpendicular to the optical axis. Consequently, the lens data, the aspheric data, and the variable air spacing data when the object distance is ∞ are exactly the same to those shown above in Table 13, Table 14, and Table 15.

As in the fifth embodiment, focus adjustment is performed by moving the third lens group G3 in the direction of the optical axis.

In the zoom lens of this embodiment, the second lens group G2 is parallel displaced in the direction perpendicular to the optical axis so that camera shake can be corrected and so that the image-forming properties when correcting camera shake are also good.

The zoom lens of this embodiment satisfies the Conditional Expression (2) described above in the second embodiment, and also satisfies the Conditional Expression (15) or the Conditional Expression (15') described above in the sixth embodiment.

It should be noted that in order to obtain even better optical performance, the zoom lens of this embodiment desirably is configured so that it satisfies the Conditional Expressions (1), (3) to (7), (8'), and (9) to (12) described above in the second embodiment or the Conditional Expression (12') described above in the sixth embodiment in place of Conditional Expression (12), as well as the Conditional Expressions (13) and (14) described above in the fourth embodiment.

The image-forming properties in the standard state of the zoom lens in this embodiment are exactly the same as the image-forming properties in the fifth embodiment, and as is clear from the aberration graphs shown in FIG. 18 to FIG. 20, the zoom lens of this embodiment demonstrates good aberration even if the zoom position is changed.

FIG. 25 shows the aberration graphs for the standard state and the aberration graphs for the camera shake corrected state of the zoom lens of this embodiment at the tele end when the aperture stop is fully open and the object distance is ∞. In the camera shake corrected state, the entire second lens group G2 has been parallel displaced by 0.081 mm in the direction perpendicular to the optical axis. FIG. 25A, FIG. 25B, and FIG. 25C show the lateral aberration at an image point that is 75% of the maximum image height (+75% image point), an image point on the axis, and an image point that is −75% of the maximum image height (−75% image point) in the standard state, respectively. FIG. 25D, FIG. 25E, and FIG. 25F show the lateral aberration at +75% image point, an image point on the axis, and −75% image point in the camera shake corrected state, respectively. In the diagrams, the solid line indicates characteristics at the d-line, the short dashed line indicates characteristics at the F-line, and the long dashed line indicates characteristics at the C-line. It should be noted that in FIG. 25, the meridional plane is the plane that includes the optical axis of the first lens group G1 and the optical axis of the second lens group G2.

The amount of image shift at the tele end with an object distance of ∞ in a case where the zoom lens is tilted 0.5° is equivalent to the amount of image shift when the entire second lens group G2 is parallel displaced by 0.081 mm in the direction perpendicular to the optical axis.

It is clear from the aberration graphs shown in FIG. 25 that in the zoom lens of this embodiment, like in the case of the sixth embodiment, sufficient camera shake correction can be achieved with respect to camera shake angles up to 0.5° without lowering the image-forming properties. Also, like in the sixth embodiment, in the zoom lens of this embodiment the air space between the aperture stop A and the third lens L3 is set to 0.9 mm, adequate space for providing the camera shake correction function is ensured, and the optical total length when collapsed can be shortened.

If the zoom lens of this embodiment is packaged in an electronic still camera, then the solid-state imaging element described above in the sixth embodiment can be used.

As described above, the zoom lens of this embodiment has a zoom ratio of approximately ×2.9 when the object distance is ∞, a field angle at the wide-angle end of approximately 63°, high resolution, a short optical total length when not in use and low sensitivity to decentration, has particularly good distortion, and furthermore is provided with a camera shake correction function and has good image-forming properties during camera shake correction.

Table 17 below shows the numerical values of Conditional Expression (15) with regard to the zoom lenses of the sixth through tenth embodiments described above.

TABLE 17

| Conditional | Embodiment | | | | |
| Expression | 6 | 7 | 8 | 9 | 10 |
| $(1 - m_{G2T})m_{G3T}$ | 1.946 | 1.906 | 1.919 | 1.885 | 1.880 |

It should be noted that in the standard state the zoom lenses of the sixth through tenth embodiments are the same as the zoom lenses according to the first through fifth embodiments, respectively, and thus Table 16 can be referenced for the numerical values of the conditional expression in the standard state.

Also, in the sixth through tenth embodiments, the zoom lenses therein were each described as having a resolution compatible with a solid-state imaging element having approximately 3 million pixels, but if the processing error of the lens elements and the lens barrel components is reduced so as to reduce assembly error, then the zoom lenses can be given a resolution that is compatible with a solid-state imaging element having a recording pixel number of approximately 4 million pixels at substantially the same recording picture size. The specific dimensions of a solid-state imaging element having approximately 4 million pixels are a recording pixel number of 2304 (horizontal)×1728 (vertical), a pixel pitch of 2.5 µm (horizontal)×2.5 µm (vertical), and a recording picture size of 5.76 mm (horizontal)×4.32 mm (vertical) (7.2 mm diagonal).

ELEVENTH EMBODIMENT

Figure 26:
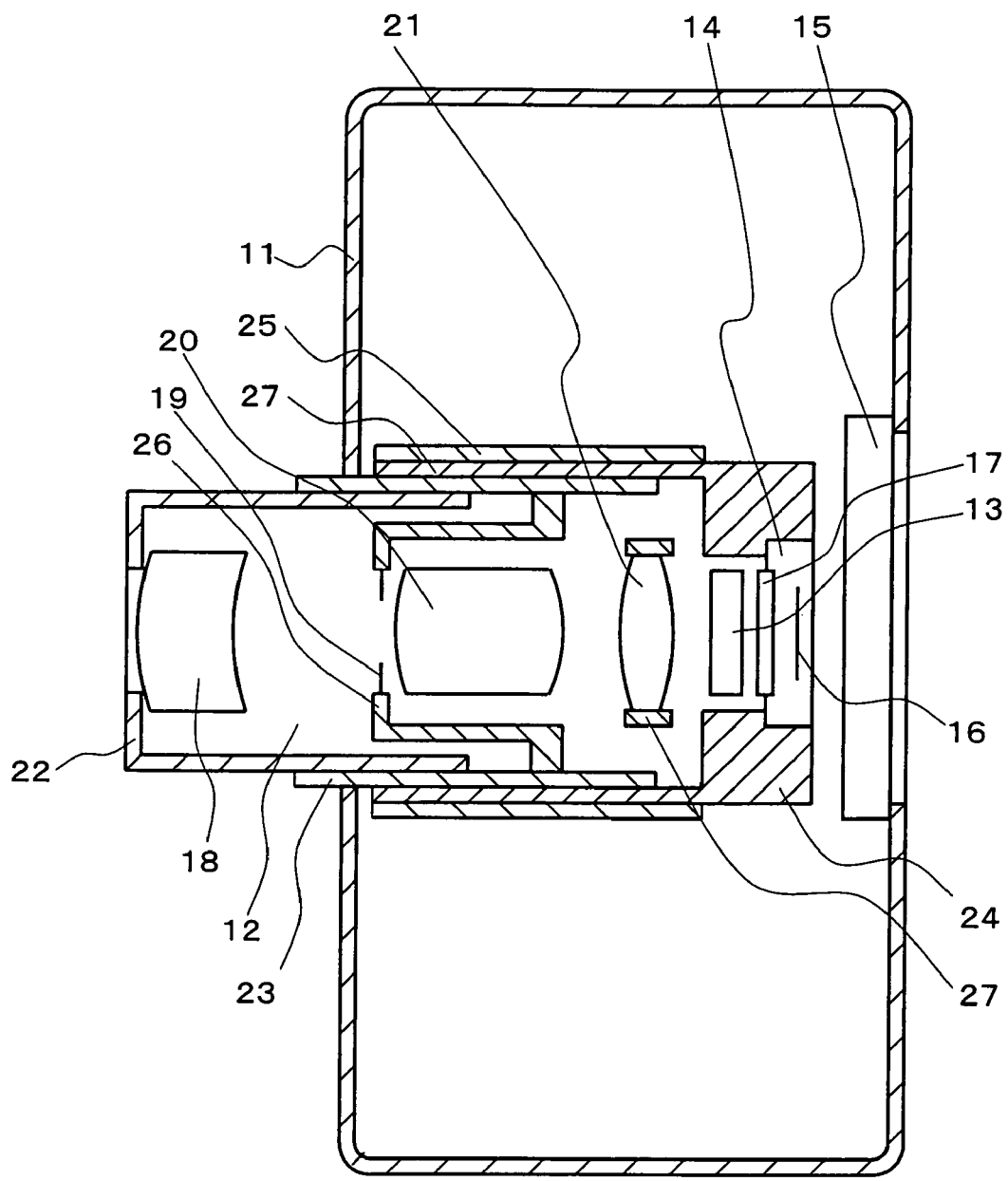
FIG. 26 diagrammatically shows the configuration of an electronic still camera according to an eleventh embodiment of the present invention.

FIG. 26 diagrammatically shows the configuration of an electronic still camera according to an eleventh embodiment of the present invention.

In FIG. 26, the reference numeral 12 denotes a zoom lens, 14 denotes a solid-state imaging element, 15 denotes a liquid crystal monitor, 18 denotes a first lens group, 19 denotes an aperture stop, 20 denotes a second lens group, and 21 denotes a third lens group.

The zoom lens 12 is arranged on the front side of a housing 11, and to the rear of the zoom lens 12 are arranged an optical low-pass filter 13 and the solid-state imaging element 14 in that order from the object side to the image plane side. The liquid crystal monitor 15 is arranged at the rear side of the housing 11, and the solid-state imaging element 14 and the liquid crystal monitor 15 are near one another.

The optical low-pass filter 13 has a configuration in which a first quartz plate, a second quartz plate, and a third quartz plate are cemented to one another by a transparent adhesive and arranged in that order from the object side to the image plane side. The three quartz plates are parallel flat plates and the optic axes of the quartz plates are tilted 45° with respect to the optical axis. Also, seen from the zoom lens 12, the directions in which the optic axes of the quartz plates are projected onto an imaging surface 16 of the solid-state imaging element 14 are for the first quartz plate a direction rotated 45° to the left from the image horizontal direction, for the second quartz plate a direction rotated 45° to the right from the image horizontal direction, and for the third quartz plate the image horizontal direction. The optical low-pass filter 13 prevents error signals such as moiré due to the pixel structure of the solid-state imaging element 14. An optical multilayer film that reflects infrared light but allows light in the visible light to pass through is vapor deposited onto the object side surface of the optical low-pass filter 13.

The solid-state imaging element 14 has an recording pixel number of 2048 (horizontal)×1536 (vertical) (approximately 3 million pixels), a pixel pitch of 2.8 µm (horizontal)×2.8 µm (vertical), and a recording picture size of 5.7344 mm (horizontal)×4.3008 mm (vertical), and each pixel is provided with a miniature positive lens. A cover glass 17 is provided on the object side of the solid-state imaging element 14. The image of the object obtained by the zoom lens 12 is formed on the imaging surface 16.

In this embodiment, the zoom lens described in the first embodiment (FIG. 1) is used as the zoom lens 12. The zoom lens 12 is made of a first lens group 18, an aperture stop 19, a second lens group 20, and a third lens group 21, arranged in that order from the object side to the image plane side.

A lens barrel is made of a moving lens barrel 22, a first cylindrical cam 23, a main lens barrel 24, a second cylindrical cam 25, a second lens group frame 26, and a third lens group frame 27. The first lens group 18 is attached to the moving lens barrel 22. The moving lens barrel 22 is incorporated into the main lens barrel 24 via the first cylindrical cam 23. The second lens group frame 26 is fixed to the inner wall of the first cylindrical cam 23, and the aperture stop 19 and the second lens group 20 are attached to the second lens group frame 26. Also, the third lens group 21 is attached to the third lens group frame 27. Then, by rotating the second cylindrical cam 25, which is attached to the outside of the main lens barrel 24, the first cylindrical cam 23 is rotated as it moves in the direction of the optical axis, and due to the rotative action of the first cylindrical cam 23, the moving lens barrel 22 and the second lens group frame 26 are moved in the direction of the optical axis. In this way, by rotating the second cylindrical cam 25, the first lens group 18 and the second lens group 20 are moved to a predetermined position with respect to the solid-state imaging element 14, and thus zooming can be performed from the wide-angle end to the tele end. When zooming from the wide-angle end to the tele end when the object distance is ∞, the first lens group 18 retreats to the image plane side and then moves toward the object side, and the second lens group 20 moves monotonically from the image plane side to the object side.

The third lens group frame 27 can be moved in the direction of the optical axis by a motor for focus adjustment. By detecting the position at which high-frequency components of the captured image become a peak while moving the third lens group frame 27 in the direction of the optical axis by the motor and then moving the third lens group 21 to that position, it is possible to carry out automatic focus adjustment. When zooming from the wide-angle end to the tele end when the object distance is ∞, the third lens group 21 retreats to the image plane side and then moves toward the object side.

By adopting a collapsed configuration in which the first lens group 18, the second lens group 20, and the third lens group 21 are each drawn toward the solid-state imaging element 14 when not in use, it is possible to shorten the optical total length of the zoom lens when not in use (when collapsed). A mechanism for drawing the first lens group 18 and the second lens group 20 toward the solid-state imaging element 14 can be achieved by extending the cam grooves of the first and second cylindrical cams 23 and 25.

As described above, it is possible to provide an electronic still camera whose zoom ratio when the object distance is ∞ is approximately ×3.0, whose field angle at the wide-angle end is approximately 66°, and which has high resolution and is thin in the depth direction when not in use.

It should be noted that the zoom lens according to the first embodiment was used in the electronic still camera shown in FIG. 26, however, any of the zoom lenses according to the second through fifth embodiments may be used in place of the zoom lens of the first embodiment.

The optical system of the electronic still camera shown in FIG. 26 also can be used in video cameras designed for moving pictures. In this case, it is possible to capture not only moving pictures but also high-resolution still pictures.

TWELFTH EMBODIMENT

Figure 27:
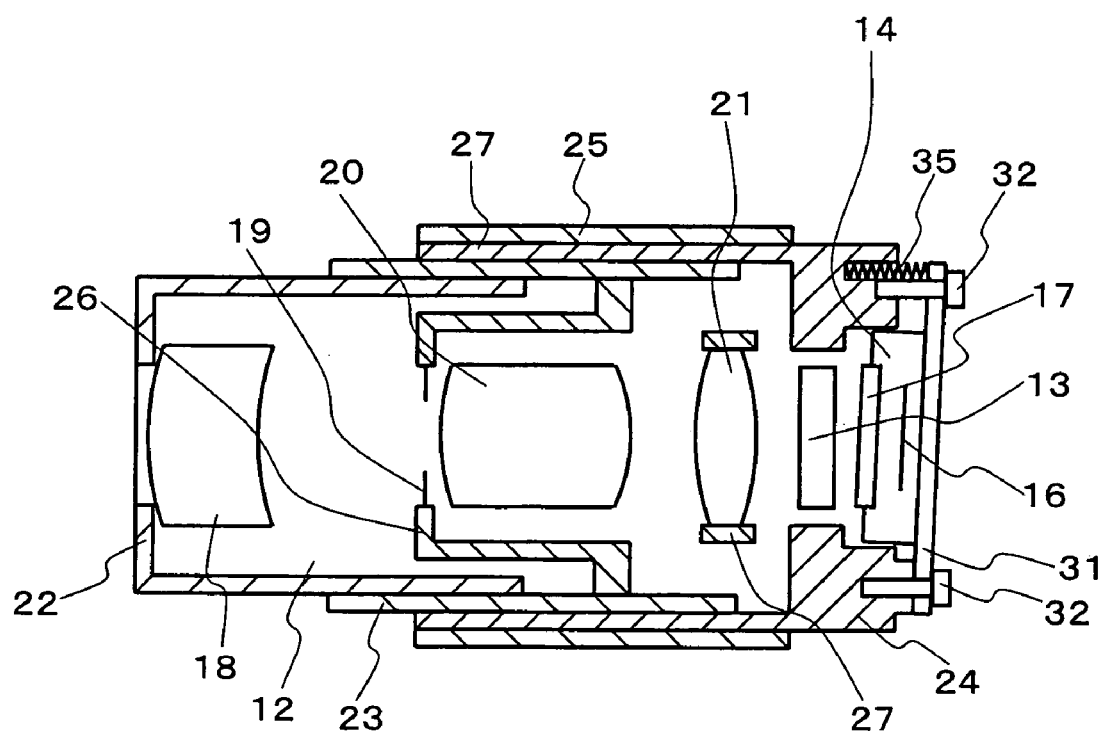
FIG. 27 diagrammatically shows the main elements of an electronic still camera according to a twelfth embodiment of the present invention.

FIG. 27 diagrammatically shows the main elements of an electronic still camera according to a twelfth embodiment of the present invention. The electronic still camera shown in FIG. 27 is the electronic still camera shown in FIG. 26, configured so that the solid-state imaging element 14 is tilted with respect to the zoom lens 12. In this embodiment, the zoom lens described in the second embodiment (FIG. 5) is used as the zoom lens 12. It should be noted that structural components that are identical to those of the electronic still camera of the eleventh embodiment are assigned identical reference numerals and detailed description thereof is omitted.

As shown in FIG. 27, an attached plate 31 is attached to the solid-state imaging element 14. Three holes are provided in the peripheral portion of the attached plate 31, and three screw holes corresponding to the three holes in the attached plate 31 are helically provided in the end face of the main lens barrel 24. Two holes are provided near two of the three screw holes of the main lens barrel 24, and springs 35 are inserted into these two holes. Also, three screws 32 (one screw is not shown) are passed through the three holes of the attached plate 31 and screwed into the three screw holes of the main lens barrel 24, thereby attaching the attached plate 31 to the main lens barrel 24. At this time the springs 35 press against the attached plate 31, so that by rotating the screws 32 near the springs 35, the angle of tilt and the tilt direction of the solid-state imaging element 14 can be adjusted freely. Then, if the three screws 32 are fastened by adhesive after adjusting the angle of tilt and tilt direction of the solid-state imaging element 14, the position and bearing of the solid-state imaging element 14 with respect to the zoom lens 12 can be kept stable.

If the lens surfaces of the zoom lens 12 are decentered, then when the solid-state imaging element 14 is attached so that its imaging surface 16 is perpendicular to the optical axis of the zoom lens 12, the image-forming properties may not be good at some regions of the imaging surface 16. However, when the above configuration is adopted, the tilt angle and the tilt direction of the solid-state imaging element 14 can be suitably adjusted so that regions with poor image-forming properties that occur in the imaging surface 16 can be corrected.

The range of the angle of tilt of the solid-state imaging element 14 can be set to approximately 1°. Then, actual images can be captured at several zoom positions from the wide-angle end to the tele end to search for regions with poor image-forming properties from the signals output from the solid-state imaging element 14, and then, while viewing the output signals, the tilt angle and the tilt direction of the solid-state imaging element 14 can be adjusted by rotating the two screws near the two springs 35 so as achieve good image-forming properties in regions where the image-forming properties are poor.

As described above, with the configuration of the electronic still camera of this embodiment, even if the lens surfaces of the zoom lens are decentered, the solid-state imaging element can be tilted so as to achieve good image-forming properties on the imaging surface of the solid-state imaging element, and thus an electronic still camera with good image-forming properties in all regions of the captured image can be achieved.

It should be noted that the zoom lens according to the second embodiment was used in the electronic still camera shown in FIG. 27, however, any of the zoom lenses according to the first and third through fifth embodiments may be used in place of the zoom lens of the second embodiment.

THIRTEENTH EMBODIMENT

Figure 28:
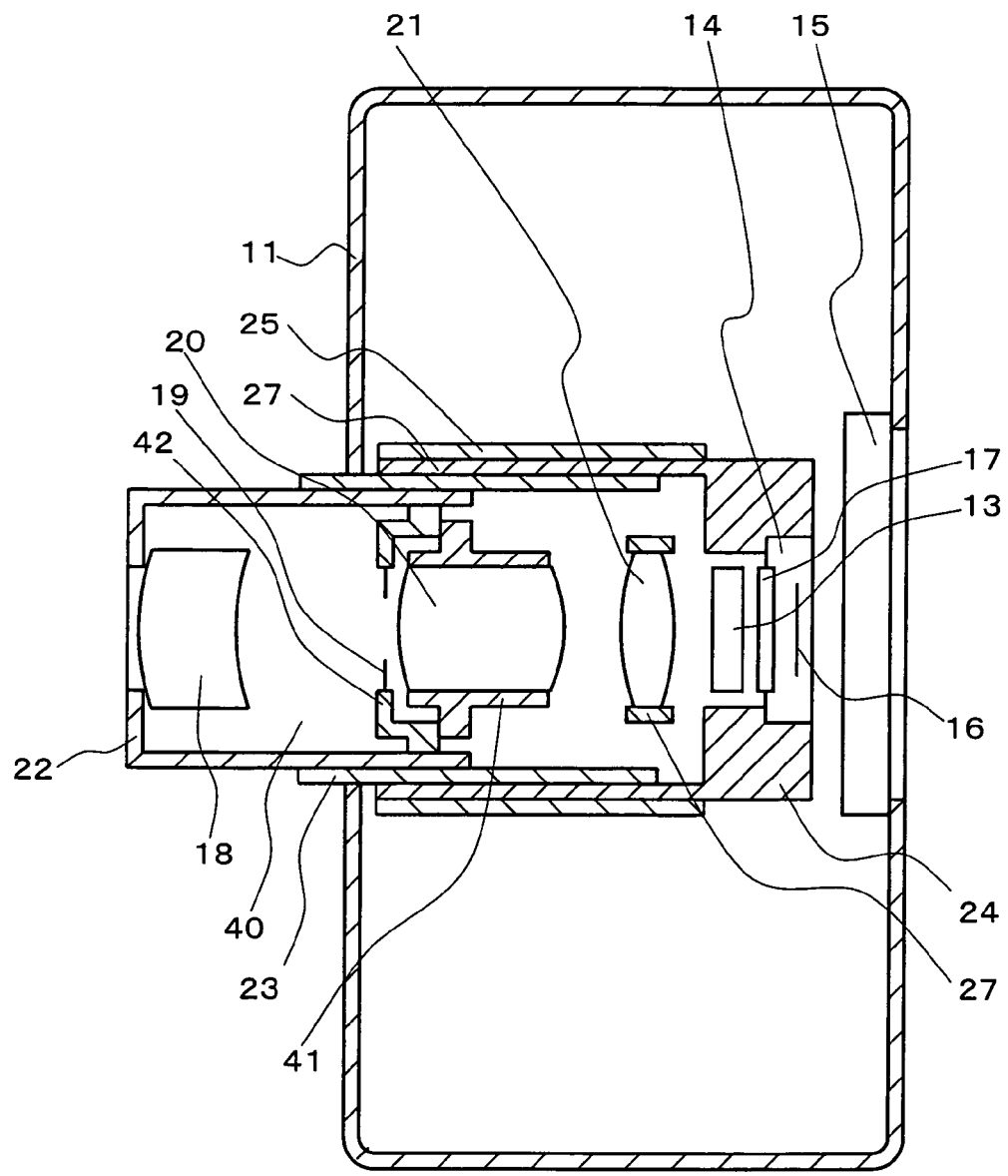
FIG. 28 diagrammatically shows the configuration of an electronic still camera according to a thirteenth embodiment of the present invention.

FIG. 28 diagrammatically shows the configuration of an electronic still camera according to a thirteenth embodiment of the present invention. The electronic still camera shown in FIG. 28 is the electronic still camera shown in FIG. 26, with a zoom lens 40 with a camera shake correction function used in place of the zoom lens 12. The zoom lens described in the sixth embodiment is used as the zoom lens 40. It should be noted that the electronic still camera of this embodiment, except for a portion of the configuration of the lens barrel of the zoom lens, is identical to the electronic still camera of the eleventh embodiment, and thus structural components that are the same as those of the electronic still camera of the eleventh embodiment are assigned identical reference numerals and detailed description thereof is omitted.

As shown in FIG. 28, the four lenses making up the second lens group 20 are attached to a second lens group frame 41. The second lens group frame 41 can be parallel displaced in the direction perpendicular to the optical axis with respect to a member 42 to which the aperture stop 19 is attached.

If the zoom lens 40 is tilted due to camera shake, then by parallel displacing the second lens group 20 by a predetermined amount using an actuator for shifting in the image horizontal direction and an actuator for shifting in the image vertical direction, it is possible to perform camera shake correction. For example, if the zoom lens is tilted due to camera shake so that its object side drops, then camera shake correction can be performed by parallel displacing the second lens group 20 upward by a predetermined amount using the actuator for parallel displacing in the image vertical direction. To perform camera shake correction requires means for detecting the camera shake angle of the zoom lens in the image horizontal direction, the camera shake angle in the image vertical direction, the combined focal length of the overall lens system, the magnification of the second lens group 20, and the magnification of the third lens group 21. Two angular velocity sensors (camera shake detection means) can be used to detect the two camera shake angles, and a position detection sensor for determining the positions of the second lens group 20 and the third lens group 21 with respect to the solid-state imaging element 14 can be used to detect the combined focal length of the overall lens system, the magnification of the second lens group 20, and the magnification of the third lens group 21. In this case, it is possible to calculate by microcomputer the camera shake angles of the two directions, the combined focal length of the overall lens system, the magnification of the second lens group 20, and the magnification of the third lens group 21 based on the output of these sensors, generate the required control signals, and input those control signals to the actuators.

As described above, it is possible to provide an electronic still camera having a zoom ratio that is approximately ×3.0 when the object distance is ∞, a field angle at the wide-angle end of approximately 66°, high resolution, is thin in the depth direction when not in use, and furthermore is provided with a camera shake correction function and has good image-forming properties during camera shake correction.

The electronic still camera described above can be provided with an electronic zoom function to serve as electronic zoom means that uses a signal processing circuit to magnify to the entire picture the image that is formed in the center portion of the solid-state imaging element. If the electronic zoom function is used, then as described below, the effects due to the camera shake correction function are noticeably obtained.

The extent of blurring due to camera shake when the zoom lens is tilted by camera shake can be evaluated using the ratio of the amount of image shift to the diagonal length of the picture recording region of the solid-state imaging element (image shift ratio). This ratio is constant regardless of the size at which printing is carried out from the signal of the captured image. The diagonal length of the captured image if an electronic zoom function is not employed matches the diagonal length of the effective region of the solid-state imaging element; however, the diagonal length of the captured image if the electronic zoom function is employed is smaller than the diagonal length of the solid-state imaging element. Consequently, if the amount of image shift is constant, then, when the electronic zoom function is employed, the image shift ratio increases, and this increases the extent of blurring due to camera shake.

When the camera shake correction function is used the amount of image shift becomes extremely small, and thus the image shift ratio is small even if the electronic zoom function is used, thus significantly reducing blurring due to camera shake.

In the electronic still camera shown in FIG. 28, disparity may occur in the image-forming properties due to the orientation of the second lens group 20 even if the second lens group 20 is parallel displaced by a same amount. In this case, by adjusting the tilt angle and the tilt direction of the solid-state imaging element 14, the disparity in the image-forming properties can be reduced.

It should be noted that the zoom lens according to the sixth embodiment was used in the electronic still camera shown in FIG. 28, however, any of the zoom lenses according to the seventh through tenth embodiments may be used in place of the zoom lens of the sixth embodiment.

Also, as the solid-state image element 14, in place of the solid-state imaging element having approximately 3 million pixels that was described above, it is also possible to use a solid-state imaging element having a recording pixel number of 2304 (horizontal)×1728 (vertical) (approximately four million pixels), a pixel pitch of 2.5 μm (horizontal)×2.5 μm (vertical), and a recording picture size of 5.76 mm (horizontal)×4.32 mm (vertical) (7.2 mm diagonal).

The optical system of the electronic still camera shown in FIG. 28 also can be used in video cameras designed for moving pictures. In such a case, it is possible to capture not only moving pictures but also still pictures with high resolution.

INDUSTRIAL APPLICABILITY

As described above, with the present invention it is possible to provide a zoom lens having a zoom ratio of ×2.5 to ×3.2 when the object distance is ∞, a field angle at the wide-angle end of 60° to 70°, a high resolution, a short optical total length when not in use, and a low sensitivity to decentration, and it is further possible to provide a zoom lens with a camera shake-correction function. Consequently, these zoom lenses can be employed in high-resolution electronic still cameras that are thin in the depth direction when not in use, and moreover they can be employed in electronic still cameras provided with a camera shake correction function.

The invention claimed is:

1. A zoom lens comprising a first lens group with a negative power, a second lens group with a positive power to whose object side an aperture stop has been fixed, and a third lens group with a positive power, arranged in that order from an object side to an image plane side;
   wherein said first lens group comprises a first lens that is a negative meniscus lens whose surface with strong curvature is facing the image plane side, and a second lens that is a positive lens whose surface with strong curvature is facing the object side, arranged in that order from the object side;
   wherein said second lens group comprises a third lens that is a positive lens whose surface with strong curvature is facing the object side, a fourth lens that is a positive lens, a fifth lens that is a negative lens, and a sixth lens that is a positive lens, arranged in that order from the object side;
   wherein said third lens group comprises a seventh lens that is a positive lens;
   wherein the image plane side surface of said first lens and the object side surface of said third lens are aspherical surfaces whose local radius of curvature is monotonically increased as distance from the center increases;
   wherein one of the surfaces of said seventh lens is an aspherical surface;
   wherein when zooming from a wide-angle end to a tele end when an object distance is ∞, said first lens group retreats to the image plane side and then moves toward the object side and said second lens group moves monotonically toward the object side; and
   wherein when $L_W$ is a length from an apex of the object side surface of said first lens to the image plane at the wide-angle end, $L_T$ is a length from the apex of the object side surface of said first lens to the image plane at the tele end, $f_W$ is a combined focal length of the entire lens system at the wide-angle end at an object distance of ∞, $f_{G2}$ is a combined focal length of said second lens group, $f_{G3}$ is a combined focal length of said third lens group, $f_i$ is a focal length of said i-th (i is a natural number) lens, $n_i$ is a refractive index of said i-th lens, and $v_i$ is the Abbe number of said i-th lens, then conditional expressions $$|L_W - L_T|/L_W < 0.1 \tag{1}$$

$$1.9 < f_{G2}/f_W < 2.4 \tag{2}$$

$$3.2 < f_{G3}/f_W < 4.0 \tag{3}$$

$$0.6 < f_3/f_{G2} < 1.1 \tag{4}$$

$$1.5 < f_6/f_{G2} < 1.8 \tag{5}$$

$$n_3 > 1.75 \tag{6}$$

$$v_3 > 35 \tag{7}$$

$$n_4 > 1.6 \tag{8}$$

$$v_4 > 45 \tag{9}$$

$$n_6 > 1.7 \tag{10}$$

$$35 < v_6 < 50 \tag{11}$$

are satisfied, a zoom ratio is ×2.5 to ×3.2 if the object distance is ∞, and a field angle at the wide-angle end is 60° to 70°.

2. The zoom lens according to claim 1,
wherein when $r_{3F}$ is a paraxial radius of curvature of the object side surface of said third lens, $\kappa_{3F}$ is a conic constant of the object side surface of said third lens, and $D_{3F}$ is a fourth-order aspheric coefficient of the object side surface of said third lens, then conditional expression $$-0.8<\kappa_{3F}+8D_{3F}r_{3F}^3<-0.5. \quad (12)$$

is satisfied.

3. The zoom lens according to claim 1,
wherein when zooming from the wide-angle end to the tele end when the object distance is ∞, said third lens group retreats to the image plane side and then moves toward the object side.

4. The zoom lens according to claim 1,
wherein said fourth lens and said fifth lens are cemented.

5. The zoom lens according to claim 1,
wherein said fifth lens and said sixth lens are in contact outside their effective diameters.

6. The zoom lens according to claim 1,
wherein the image plane side surface of said third lens is a flat surface or a concave surface.

7. A zoom lens comprising a first lens group with a negative power, a second lens group with a positive power to whose object side an aperture stop has been fixed, and a third lens group with a positive power, arranged in that order from an object side to an image plane side;
wherein said first lens group comprises a first lens that is a negative meniscus lens whose surface with strong curvature is facing the image plane side, and a second lens that is a positive lens whose surface with strong curvature is facing the object side, arranged in that order from the object side;
wherein said second lens group comprises a third lens that is a positive lens whose surface with strong curvature is facing the object side, a fourth lens that is a positive lens, a fifth lens that is a negative lens, and a sixth lens that is a positive lens, arranged in that order from the object side;
wherein said third lens group comprises a seventh lens that is a positive lens;
wherein the image plane side surface of said first lens and the object side surface of said third lens are aspherical surfaces whose local radius of curvature is monotonically increased as distance from the center increases;
wherein one of the surfaces of said seventh lens is an aspherical surface;
wherein when zooming from a wide-angle end to a tele end when an object distance is ∞, said first lens group retreats to the image plane side and then moves toward the object side and said second lens group moves monotonically toward the object side; and
wherein when $L_W$ is a length from an apex of the object side surface of said first lens to the image plane at the wide-angle end, $L_T$ is a length from the apex of the object side surface of said first lens to the image plane at the tele end, $f_W$ is a combined focal length of the entire lens system at the wide-angle end at an object distance of ∞, $f_{G2}$ is a combined focal length of said second lens group, $f_{G3}$ is a combined focal length of said third lens group, $f_i$ is a focal length of said i-th (i is a natural number) lens, $n_i$ is a refractive index of said i-th lens, and $v_i$ is the Abbe number of said i-th lens, then conditional expressions $$|L_W-L_T|/L_W<0.1 \quad (1)$$

$$1.9<f_{G2}/f_W<2.4 \quad (2)$$

$$3.2<f_{G3}/f_W<4.0 \quad (3)$$

$$0.6<f_3/f_{G2}<1.1 \quad (4)$$

$$1.5<f_6/f_{G2}<1.8 \quad (5)$$

$$n_3>1.75 \quad (6)$$

$$v_3>35 \quad (7)$$

$$n_4>1.6 \quad (8')$$

$$v_4>45 \quad (9)$$

$$n_6>1.7 \quad (10)$$

$$35<v_6<50 \quad (11)$$

are satisfied, a zoom ratio is ×2.5 to ×3.2 if the object distance is ∞, and a field angle at the wide-angle end is 60° to 70°.

8. The zoom lens according to claim 7,
wherein when $r_{3F}$ is a paraxial radius of curvature of the object side surface of said third lens, $\kappa_{3F}$ is a conic constant of the object side surface of said third lens, and $D_{3F}$ is a fourth-order aspheric coefficient of the object side surface of said third lens, then conditional expression $$-0.8<\kappa_{3F}+8D_{3F}r_{3F}^3<-0.5 \quad (12)$$

is satisfied.

9. The zoom lens according to claim 7,
wherein when zooming from the wide-angle end to the tele end when the object distance is ∞, said third lens group retreats to the image plane side and then moves toward the object side.

10. The zoom lens according to claim 7,
wherein said fourth lens and said fifth lens are cemented.

11. The zoom lens according to claim 7,
wherein said fifth lens and said sixth lens are in contact outside their effective diameters.

12. The zoom lens according to claim 7,
wherein the image plane side surface of said third lens is a flat surface or a concave surface.

13. The zoom lens according to claim 7,
wherein when $r_{1F}$ is the radius of curvature of the object side surface of said first lens and $r_{2R}$ is the radius of curvature of the image plane side surface of said second lens, then conditional expressions $$9<r_{1F}/f_W<13 \quad (13)$$

$$3.8<r_{2R}/f_W<4.7 \quad (14)$$

are satisfied.

14. A zoom lens comprising a first lens group with a negative power, an aperture stop, a second lens group with a positive power, and a third lens group with a positive power, arranged in that order from an object side to an image plane side;
wherein said first lens group comprises a first lens that is a negative lens whose surface with strong curvature is facing the image plane side, and a second lens that is a positive lens whose surface with strong curvature is facing the object side, arranged in that order from the object side;

wherein said second lens group comprises a third lens that is a positive lens whose surface with strong curvature is facing the object side, a fourth lens that is a positive lens, a fifth lens that is a negative lens, and a sixth lens that is a positive lens, arranged in that order from the object side, and also can be parallel displaced in a direction perpendicular to an optical axis;

wherein said third lens group comprises a seventh lens that is a positive lens;

wherein when zooming from a wide-angle end to a tele end when an object distance is ∞, said first lens group retreats to the image plane side and then moves toward the object side and said second lens group moves monotonically toward the object side; and wherein when $f_W$ is a combined focal length of the entire lens system at the wide-angle end at an object distance of ∞, $f_{G2}$ is a combined focal length of said second lens group, and $m_{G2T}$ and $m_{G3T}$ are magnifications of said second lens group and said third lens group, respectively, at the tele end at an object distance of ∞, then conditional expressions $$1.9 < f_{G2}/f_W < 2.4 \quad (2)$$

$$1.7 < (1-m_{G2T})m_{G3T} < 2.1 \quad (15)$$

are satisfied, a zoom ratio is ×2.5 to ×3.2 if the object distance is ∞, and a field angle at the wide-angle end is 60° to 70°.

15. The zoom lens according to claim 14, wherein focus adjustment is carried out by moving said third lens group in the direction of the optical axis.

16. The zoom lens according to claim 14, wherein when $L_W$ is a length from an apex of the object side surface of said first lens to the image plane at the wide-angle end, $L_T$ is a length from the apex of the object side surface of said first lens to the image plane at the tele end, then conditional expression $$|L_W - L_T|/L_W < 0.1 \quad (1)$$

is satisfied.

17. The zoom lens according to claim 14, wherein when $f_{G3}$ is a combined focal length of said third lens group, then conditional expression $$3.2 < f_{G3}/f_W < 4.0 \quad (3)$$

is satisfied.

18. The zoom lens according to claim 14, wherein when $f_3$ is a focal length of said third lens and $f_6$ is a focal length of said sixth lens, then conditional expressions $$0.6 < f_3/f_{G2} < 1.1 \quad (4)$$

$$1.5 < f_6/f_{G2} < 1.8 \quad (5)$$

are satisfied.

19. The zoom lens according to claim 14, wherein when $n_i$ is a refractive index of said i-th lens (i is a natural number) and $v_i$ is the Abbe number of said i-th lens, then conditional expressions $$n_3 > 1.75 \quad (6)$$

$$v_3 > 35 \quad (7)$$

$$n_4 > 1.7 \quad (8')$$

$$v_4 > 45 \quad (9)$$

$$n_6 > 1.7 \quad (10)$$

$$35 < v_6 < 50 \quad (11)$$

are satisfied.

20. The zoom lens according to claim 14, wherein the image plane side surface of said first lens is an aspherical surface whose local radius of curvature is monotonically increased as distance from the center increases, and at least one of the surfaces of said seventh lens is an aspherical surface.

21. The zoom lens according to claim 14, wherein the object side surface of said third lens is an aspherical surface whose local radius of curvature is monotonically increased as distance from the center increases.

22. The zoom lens according to claim 14, wherein the object side surface of said third lens is an aspherical surface, and when $r_{3F}$ is a paraxial radius of curvature of said aspherical surface, $\kappa_{3F}$ is a conic constant of said aspherical surface, and $D_{3F}$ is a fourth-order aspheric coefficient of said aspherical surface, then conditional expression $$-0.8 < \kappa_{3F} + 8D_{3F}r_{3F}^3 < -0.5 \quad (12)$$

is satisfied.

23. The zoom lens according to claim 14, wherein said fourth lens and said fifth lens are cemented.

24. The zoom lens according to claim 14, wherein said fifth lens and said sixth lens are in contact outside their effective diameters.

25. The zoom lens according to claim 14, wherein the image plane side surface of said third lens is a flat surface or a concave surface.

26. The zoom lens according to claim 14, wherein when $r_{1F}$ is the radius of curvature of the object side surface of said first lens and $r_{2R}$ is the radius of curvature of the image plane side surface of said second lens, then conditional expressions $$9 < r_{1F}/f_W < 13 \quad (13)$$

$$3.8 < r_{2R}/f_W < 4.7 \quad (14)$$

are satisfied.

27. An electronic still camera comprising a zoom lens and a solid-state imaging element,
wherein any zoom lens set forth in claim 1 is used as the zoom lens.

28. An electronic still camera comprising a zoom lens and a solid-state imaging element,
wherein any zoom lens set forth in claim 7 is used as the zoom lens.

29. The electronic still camera according to claim 28, wherein tilt of said solid-state imaging element can be adjusted.

30. An electronic still camera comprising a zoom lens and a solid-state imaging element,
wherein any zoom lens set forth in claim 14 is used as the zoom lens.

31. The electronic still camera according to claim 30, further comprising:
an electronic zoom means that uses a signal processing circuit to magnify, up to full picture, an image formed in a center portion of said solid-state imaging element.

32. The electronic still camera according to claim 30, wherein tilt of said solid-state imaging element can be adjusted.

* * * * *